(12) United States Patent
Paver et al.

(10) Patent No.: US 8,200,902 B2
(45) Date of Patent: Jun. 12, 2012

(54) CACHE DEVICE FOR COUPLING TO A MEMORY DEVICE AND A METHOD OF OPERATION OF SUCH A CACHE DEVICE

(75) Inventors: Nigel Charles Paver, Austin, TX (US); Stuart David Biles, Bury St Edmunds (GB); Dam Sunwoo, Austin, TX (US); Prakash Shyamlal Ramrakhyani, Austin, TX (US)

(73) Assignee: ARM Limited, Cambridge (GB)

( * ) Notice: Subject to any disclaimer, the term of this patent is extended or adjusted under 35 U.S.C. 154(b) by 191 days.

(21) Appl. No.: 12/801,484

(22) Filed: Jun. 10, 2010

(65) Prior Publication Data

US 2011/0307664 A1 Dec. 15, 2011

(51) Int. Cl.
*G06F 12/00* (2006.01)
(52) U.S. Cl. ........................................................ 711/133
(58) Field of Classification Search ........................ None
See application file for complete search history.

(56) References Cited

U.S. PATENT DOCUMENTS

| | | | | |
|---|---|---|---|---|
| 5,287,512 | A * | 2/1994 | Ellis ............................. | 711/144 |
| 7,437,510 | B2 * | 10/2008 | Rosenbluth et al. .......... | 711/118 |
| 8,001,331 | B2 * | 8/2011 | Biles et al. .................... | 711/133 |
| 2008/0052466 | A1 * | 2/2008 | Zulauf ........................... | 711/125 |

OTHER PUBLICATIONS

Cuppu et al., "A Performance Comparison of Contemporary DRAM Architectures", *1999 IEEE*, May 1999, pp. 1-12.
Gill et al., "WOW: Wise Ordering for Writes—Combining Spatial and Temporal Locality in Non-Volatile Caches", *USENIX Association, FAST '05*, pp. 129-142.

Lin et al., "Reducing DRAM Latencies with an Integrated Memory Hierarchy Design", $7^{th}$ *Intl. Symposium on High Performance Computer Architecture*, Jan. 2001, 12 pages.
McKee et al., "Access Ordering and Memory-Conscious Cache Utilization", *1st Symposium on High Performance Computer Architecture*, Jan. 1995, 10 pages.
Nesbit et al., "Fair Queuing Memory Systems", *Univ. of Wisconsin and Sun Microsystems, Inc.*, (No Date), 12 pages.
Rixner et al., "Memory Access Scheduling", *ISCA-27*, 2000, pp. 1-11.

(Continued)

*Primary Examiner* — Hiep Nguyen
(74) *Attorney, Agent, or Firm* — Nixon & Vanderhye P.C.

(57) ABSTRACT

A cache device is provided for use in a data processing apparatus to store data values for access by an associated master device. Each data value has an associated memory location in a memory device, and the memory device is arranged as a plurality of blocks of memory locations, with each block having to be activated before any data value stored in that block can be accessed. The cache device comprises regular access detection circuitry for detecting occurrence of a sequence of accesses to data values whose associated memory locations follow a regular pattern. Upon detection of such an occurrence of a sequence of accesses by the regular access detection circuitry, an allocation policy employed by the cache to determine a selected cache line into which to store a data value is altered with the aim of increasing a likelihood that when an evicted data value output by the cache is subsequently written to the memory device, the associated memory location resides within an already activated block of memory locations. Hence, by detecting regular access patterns, and altering the allocation policy on detection of such patterns, this enables a reuse of already activated blocks within the memory device, thereby significantly improving memory utilization, thereby giving rise to both performance improvements and power consumption reductions.

36 Claims, 19 Drawing Sheets

OTHER PUBLICATIONS

S. Rixner, "Memory Control Optimizations for Web Servers", *Rice University*, (No Date), 12 pages.

Wong et al., "DRAM Caching", *Univ. of Washington, Dept. of Computer Science and Engineering*, (No Date), 22 pages.

W. Wong, "Techniques Utilizing Memory Reference Characteristics for Improved Performance", *Univ of Washington*, 2002, 115 pages.

Zhang et al., "A Permutation-based Page Interleaving Scheme to Reduce Row-buffer Conflicts and Exploit Data Locality", *33rd Annual Int'l. Symposium on Microarchitecture*, Dec. 2000, 10 pages.

Dahlgren et al., "Effectiveness of Hardware-Based Stride and Sequential Prefetching in Shared-Memory Multiprocessors", *1995 IEEE*, pp. 68-77.

\* cited by examiner

STRIDE DETECTION TABLE

| Inst$^n$ Addr | Data Addr | Stride | Stride det indication |
|---|---|---|---|
|  |  |  |  |
|  |  |  |  |
|  |  |  |  |
|  |  |  |  |
|  |  |  |  |
|  |  |  |  |

305 — sd_e entry
310 — Index (HASH OF INST$^N$ ADDRESS WITH SD-SIZE)
300 — SD_SIZE

FIG. 5

| Inst$^n$ Addr | Data Addr | Last Direction (Row W) | Stride | Stride Det | Stride Det R | Stride Det W |
|---|---|---|---|---|---|---|
| | | | | | | |
| | | | | | | |
| | | | | | | |

Stride Det, Stride Det R, Stride Det W are STRIDE DETECTION INDICATIONS.

505 — 510 — INDEX — 500

FIG. 9

| Inst$^n$ Addr | Data Addr | Stride | Stride Det Indication | Allocation count per way |
|---|---|---|---|---|
| | | | | |
| | | | | |
| ⋮ | ⋮ | ⋮ | ⋮ | ⋮ |
| | | | | |

605 — 610 INDEX — 600

FIG. 11

CACHE DEVICE FOR COUPLING TO A MEMORY DEVICE AND A METHOD OF OPERATION OF SUCH A CACHE DEVICE

BACKGROUND OF THE INVENTION

1. Field of the Invention

The present invention relates to a cache device for coupling to a memory device, and to a method of operation of such a cache device. In particular the present invention relates to a cache device for coupling to a memory device arranged as a plurality of blocks of memory locations, where each block has to be activated before any data value stored in that block can be accessed.

2. Description of the Prior Art

Many system memories (including, for example, DRAM) feature a property where sequential accesses are processed faster than non-sequential accesses. Many system memories (especially DRAM) also have the concept of page access, where access to a previously opened page is faster than to one that has never been accessed. Further, memories typically have a limit on the number of pages being open at one time, having to close a page in order to open a new one.

For performance and energy consumption reasons, it is therefore beneficial to extract the highest level of page reuse from a stream of memory transactions as possible. One type of operation that will generate a stream of memory transactions is a block copy operation (for example memory copy and set operations). Due to the volume of memory transactions associated with such operations, the efficiency of block copy operations is important to system performance. In principle a memory copy operation (also referred to herein as a memcpy operation) features two transaction streams, namely one read transaction stream and one write transaction stream. However, often the master device (e.g. a central processing unit (CPU)) performing the memcpy operation will not be directly coupled to the system memory, but instead will be coupled to a memory controller (that interfaces to the memory) via one or more levels of cache. When filtered through a modern cache design, these two transaction streams are transformed into three fundamental streams, namely a read stream, an eviction stream due to read allocations in the cache, and an eviction stream due to write allocations in the cache. Furthermore the schemes used to determine which cache line is evicted often introduce a pseudo random property and as a result the addresses of the two eviction streams tend to have little correlation. This leads to poor page reuse in the memory controller interfacing to the memory device.

The above problem will be discussed in more detail with reference to FIGS. 1 to 3. FIG. 1 illustrates a data processing system 10 taking the form of a System-on-Chip (SoC). Within the SoC, a CPU 15 is provided that is coupled via a cache 20 to a SoC bus 25. A memory controller 30 is also connected to the SoC bus for interfacing with a memory device 50 via a memory interface bus 35. In this example the memory device takes the form of a DRAM. A DRAM memory is typically organized in banks (typically 4-8 per rank), and in the example of FIG. 1 four banks 80, 85, 90, 95 are shown. Each bank contains an array of memory bit cells 82, and has an associated array of sense amplifiers 60, 65, 70, 75 which serve to sense signal values upon bit lines 84 passing through the memory banks and representing bit values stored within the bit cells 82 of a row of bit cells. The row of bit cells is selected for access by wordline signal WL asserted across the memory banks 80, 85, 90 and 95. This type of arrangement of a memory 50 will be familiar to those in this technical field and will not be described further herein.

The output from the sense amplifiers 60, 65, 70, 75 is stored into a buffer store 55 within the memory 50. This buffer store 55 has a number of row buffers, each row buffer containing the bit values from a complete row of bit cells as selected by the wordline signal WL. While the bit values continue to be stored in the buffer store 55, subsequent accesses to those same bit values will take place via the buffer store 55 rather than requiring a fresh read of the row of bit cells selected by the wordline signal WL. When a new row of bit cells is to be accessed, then to make space in the buffer store for that new row, the contents of a row buffer within the buffer store 55 will be written back into the row of bit cells concerned if necessary, for instance if any of the bit values have been changed or if the initial read of the bit cells concerned was destructive.

Each bank 80, 85, 90, 95 will comprise a plurality of rows and a plurality of columns, each row holding a single page of data, and the width of a column being equal to the width of the data bus on the DRAM chip. Each bank has a row buffer associated with it that can hold data from a single row (page) in the bank. Data is fetched from a DRAM bank in page-granularity (typically of size 4 KB, 8 KB or 16 KB). The data in the DRAM is stored as charge on a leaky capacitor (thus requiring regular refreshes). The charge on the individual capacitors is so small that a single read of the data discharges the capacitor completely, i.e. a single read actually erases the data that was stored in the capacitance. This data is however then captured in the row buffer associated with the bank. This operation of fetching a page of data from the leaky capacitors and putting it in a row-buffer is called an ACTIVATE (RAS command). This operation is illustrated schematically in FIG. 2A, where in response to a RAS command, an 8 Kbyte page of data is read from a DRAM bank into the row buffer 100.

Thereafter, individual columns of data (in the FIG. 2A example each column 110 being 32 bits wide) can then be read from/written to the page that has been fetched into the buffer using read/write (RD/WR) CAS commands, causing 32-bit wide blocks of data to pass over the memory interface 35 between the row buffer 100 and the memory controller 30.

The total capacity of the DRAM far exceeds the total capacity of row buffers available in the buffer store 55. If a particular cache line needs to be read from/written to DRAM and the bank that the cache line's page would map to has another row/page in its row buffer, then the page that is currently open needs to be written back to its location on the capacitance store, before the desired page can be fetched. This operation of putting a page back on the capacitance store is called a PRECHARGE operation. This situation, where the bank that data needs to be read from has a different page open, is called a PAGE MISS condition. If the row buffer was empty (holding no data) then no data needs to be written back to the capacitance store (i.e. no precharge operation is required). However the appropriate page does need to be fetched into the row buffer using an ACTIVATE command. This situation is called a PAGE EMPTY condition. If the page that needs to be accessed is already in the row buffer then it is termed a PAGE HIT condition. To summarize, in case of a PAGE MISS condition, three DRAM operations need to be issued, namely precharge, activate (RAS), and RD/WR CAS operations. In case of a PAGE EMPTY condition, two DRAM operations need to be issued, namely activate (RAS) and RD/WR CAS operations. In the event of a PAGE HIT condition only one DRAM operation is needed, namely a RD/WR CAS operation.

It should be noted that no data is on the data bus when a precharge or activate command is issued and each command takes multiple cycles to complete. To achieve 100% bus utilization it is necessary to have 100% page hits. There are various known techniques that try to maximize page hits/bus bandwidth, in particular increasing the number of banks per rank, increasing the page size, and/or mapping pages to banks (using appropriate address bits) such that there is minimum interference and thus fewer page misses. Further, as illustrated in FIG. 2B, the memory controller 30 will typically have a buffer 150 for storing pending memory accesses, and the memory access manager 160 may perform some reordering of the memory accesses having regard to a list of open rows 170 in order to try and optimise page hits within the DRAM. However, such techniques do not avoid inefficiency problems when handling large sequences of accesses such as can occur when performing block copy operations such as memory copy and set operations.

Memory copy and set operations are a critical part of system performance. It is common for these to use standard c library functions such as memcpy and memset that have been optimized to take advantage of architecture features—in the case of designs developed by ARM Limited, features such as preload (PLD) have been used to create optimized ARM memcpy routines.

A memcpy routine copies a block of data from a source region of memory to a destination region. The routine is provided with pointers of where to read the source data from and where to write the destination data to. In terms of memory requests this results in one read operation and then one write operation to transfer a single item of data (typically a word of data). In a simple system with no cache this generates two address streams into memory and the DRAM devices. With DRAM devices typically having the capability of having up to 4 banks open at any one time, the read and write streams can occupy a bank without necessarily conflicting with each other (note however that they can still conflict depending on actual address of the source and destination). Hence, if the source and destination address each occupy a different DRAM bank, then every sequential transfer can happen and achieve an open page hit in their respective banks, and hence achieve high memory utilization rates.

However in a cached memory subsystem the address patterns to memory are not as sequential and predictable. If the cache is already full of data items then the current data in the cache has to be evicted to make room for the memcpy read data and similarly the write data causes evictions to make room for the memcpy write data. The read data still has to be fetched from external memory but with modern cache allocation polices the write data is usually allocated directly into the cache, and with optimized allocation polices, if sequential write activity is detected, then the line being written to does not have to be fetched from external memory (if it is known that the entire line will be written to, then it does not need to be fetched as all the data will be replaced.)

As illustrated in FIG. 3A, the address streams that are sent to DRAM are as follows:

Read address stream to get data to be copied;
Write eviction stream to make space for read data; and
Write eviction stream to make space for write data.

In this example it is noted that the write data itself does not go to DRAM as this is write allocated directly into the cache.

The memory traffic is hence one read and two write eviction streams. The data being evicted is effectively random data out of the cache so may have no correlation from one eviction to the next. A stream of evictions to random addresses will likely cause the DRAM to have page misses that will cause the DRAM to precharge and activate, which can cost typically 10 cycles of DRAM time where no useful work can be undertaken. This results in reduced efficiency of the DRAM interface. The random write eviction data may actually cause more conflicts (and hence reduced efficiency) with the sequential read stream too. The problem is compounded by the fact that there are two random write eviction streams (one caused by the memcpy reads and one caused by the memcpy writes). These tend to hide the regular nature of the read stream due to the three streams being multiplexed together when creating the stream of accesses to the DRAM.

FIG. 3B shows the pin activity of a DRAM during a memcpy operation. This shows the read transaction and the write eviction streams. The two read data transactions 180 are sequential so get a page hit, and fortunately the corresponding write evictions 185 happen to be sequential in this case (by chance). However, the other write transactions 187, 189 each require a precharge and activate. The time 190 occupied by the precharge and activate operations prevents any useful use of the pins and therefore reduces the utilization of the pins. In this case the utilization is 58%. If the write eviction traffic exhibited more sequential behaviour then some of the precharge and activates could be removed thus increasing pin utilization.

Several areas of research have attempted to address the problem of optimizing DRAM memory access latency and bandwidth utilization. Rixner et al have discussed various policies to reorder accesses to memory to improve bandwidth utilization. In general prioritizing accesses that hit on open rows helps improve bandwidth utilization, as discussed for example in Rixner, S., Daily, W J., Kapasi, U. J., Mattson, P., and Owens, J. D. "Memory access scheduling" in Proc. of the 27th Intl. Symp. on Comp. Arch. (Vancouver, British Columbia, Canada). ISCA '00. 128-138, and Rixner, S. "Memory Controller Optimizations for Web Servers" in Proc. of the 37th Intl. Symp. on Microarchitecture (Portland, Oreg., Dec. 4-08, 2004). Micro '04. 355-366. Rixner also considers the tradeoffs of using Virtual channel SDRAMs (where a small SRAM cache formed from partial segments of row buffers is managed separately by the memory controller) in the latter article.

Lin, Reinhardt and Burger have proposed prioritizing prefetch data such that those that hit in row buffers are pushed out first and prefetch requests are sent out only when the data bus is idle, as discussed in Lin, W.-F., Reinhardt, S. K. and Burger, D. "Reducing DRAM latencies with an integrated memory hierarchy design" in Proceedings of the 7th International Symposium on High Performance Computer Architecture, pages 301-312, January 2001. Mckee and Wulf developed analytical timing models for blocked and streaming access patterns and analysed the tradeoffs of prefetching various sizes of these patterns with a view to hide miss latencies on DRAM row buffers, as discussed in Mckee, S. A. and Wulf, W. A. "Access ordering and memory-conscious cache utilization" in Proceedings of the 1st IEEE Symposium on High-Performance Computer Architecture (Jan. 22-25, 1995).

Ordering of write-destages from the write-cache in a storage controller has been looked into to improve the overall throughput, as discussed in Gill, B. S. and Modha, D. S. "WOW: wise ordering for writes—combining spatial and temporal locality in non-volatile caches" in Proceedings of the 4th Conference on USENIX Conference on File and Storage Technologies—Volume 4 (San Francisco, Calif., Dec. 13-16, 2005).

Performance trade-offs of various DRAM architectures like EDO DRAM, SDRAM, ESDRAM, Rambus etc have been studied by Cuppu et al, as discussed in Cuppu, V., Jacob, B., Davis, B., and Mudge, T. 1999. "A performance comparison of contemporary DRAM architectures" in Proceedings of the 26th Annual international Symposium on Computer Architecture (Atlanta, Ga., United States, May 1-4, 1999). The differences in these architectures is largely in the handshake and interface between the memory controller and DRAM, the row (page) buffer organization and the data bus width. They show the row buffer hits rates against SPEC benchmarks for various organizations for read only traffic and read-write traffic. In read only traffic the write traffic is ignored by the memory controller—read only traffic shows a lot more row buffer hits. To quote the authors "Write traffic, due to writebacks, disrupts the locality of the address stream for architectures with fewer internal banks". The paper is a bit dated so the DRAM sizes and cache sizes considered are also dated. In general as long as the LLC is larger than the total size of row buffers on the DRAM, random write-back traffic is bound to disrupt locality.

Wong discusses swapping row address and column address bits in an attempt to improve row (page) hit rate, as discussed in Wayne A. Wong "Techniques Utilizing Memory Reference Characteristics for Improved Performance", PhD Thesis. University of Wisconsin. Zhang et al show that when a cache line is being evicted due to a read to a conflicting cache line, the line being evicted is bound to conflict with the newly fetched line in the row buffers as well (i.e. cause a page miss), as discussed in the article Zhang, Z., Zhu, Z., and Zhang, X. "A permutation-based page interleaving scheme to reduce row-buffer conflicts and exploit data locality", in Proceedings of the 33rd Annual ACM/IEEE international Symposium on Microarchitecture (Monterey, Calif., United States). They propose a scheme to reduce conflicts by XOR-ing the middle order bits that are normally used for bank id with upper order bits of the row address (page id) to determine the actual bank id.

Nesbit et al propose to schedule requests coming from different threads in a multi-core system by estimating the finish times of various requests in a system where each thread has a bus of its own with a fraction of the actual bandwidth. Requests that have earlier finish times are prioritized, as discussed in Nesbit, J., Aggarwal, N., Laudon, J. and Smith, J. E. "Fair Queuing Memory Systems", in Proc. of the 39rd ACM/IEEE Symposium on Microarchitecture (MICRO), 2006. Wong and Baer consider organizing the row buffers as a regular multiway-associative cache and presents hit rates for various line sizes and associativities, as discussed in Wayne A. Wong and Jean-Loup Baer. "Dram caching", Technical Report 97-03-04, Department of Computer Science and Engineering, University of Washington, 1997. They also presents a set of 'early' precharge policies like 'precharge after one read' precharge after two reads' etc to hide the precharge latency and hence improve access latency.

As will be apparent from the above discussion, most of the previously proposed schemes to improve DRAM bandwidth utilization tackle the problem by suggesting optimizations in the memory controller, for example scheduling requests to improve hit rate, determining bank id and row/column address by selecting the right combination of physical address bits, proactively closing pages before a row buffer conflict is encountered to hide the latency of precharge commands, etc. A few researchers have proposed aligning prefetches with an awareness of the DRAM organization.

The Cortex A9 processor developed by ARM Limited has a feature whereby on detection of three sequential write operations, the level 1 cache is reconfigured into a non-write-allocate mode (regardless of requests in cache allocation bits). This means that the following sequential write traffic is not cached in the level 1 cache. If there were no intervening cache levels between the level 1 cache and the memory, this would mean that a series of sequential writes would be passed in their original order to memory. However, typically there will be intervening cache levels, such as a level 2 cache, which would cache such accesses, and later evict them to memory, whereby the above described problems would still arise. Further, operations such as memcpy operations involve a stream of sequential reads as well as a stream of sequential writes, and the sequential reads will still be cached in the level 1 cache, giving rise to problems due to the random nature of the write eviction stream used to make way for the read data in the cache.

It is an object of the present invention to seek to improve processor efficiency and memory utilization when external memory devices are connected to the processor, when those memory devices contain blocks that need to be activated before they can be accessed.

SUMMARY OF THE INVENTION

Viewed from a first aspect, the present invention provides a cache device for use in a data processing apparatus to store data values for access by an associated master device, each data value having an associated memory location in a memory device, the memory device being arranged as a plurality of blocks of memory locations, each block having to be activated before any data value stored in that block can be accessed, the cache device comprising: a cache storage having a plurality of cache lines for storing said data values; allocation circuitry, responsive to a data value to be allocated into the cache storage, to determine which cache line of said plurality of cache lines to store said data value into, the cache storage providing more than one cache line in which the data value can be stored, and the allocation circuitry employing an allocation policy to determine one of said more than one cache line as a selected cache line for storing of said data value; eviction circuitry, responsive to an indication of said selected cache line, to evict any data value currently stored in said selected cache line, whereby the evicted data value is written into the memory device at the associated memory location if that evicted data value is more up to date than the data value already stored in the memory device at the associated memory location; and regular access detection circuitry for detecting occurrence of a sequence of accesses to data values whose associated memory locations follow a regular pattern; upon detection of the occurrence of said sequence of accesses by the regular access detection circuitry, said allocation policy employed by the allocation circuitry being altered to increase a likelihood that when an evicted data value output by the eviction circuitry is written to the memory device, the associated memory location resides within an already activated block of memory locations.

In accordance with the present invention, regular access detection circuitry is used to detect occurrence of a sequence of accesses to data values whose associated memory locations follow a regular pattern. Once such a sequence has been detected, the allocation policy used by the cache is altered with the aim of increasing the likelihood that when data is subsequently evicted, the associated memory location for that data will reside in an already activated block of memory locations. Hence, by managing where in the cache data associated with the sequence of accesses is placed, this can ensure that when that data is later evicted the regular nature of the accesses is still replicated in the eviction stream, and hence can lead to much better memory utilisation by re-use of already activated blocks, reducing the number of times blocks have to be activated.

The types of sequences of accesses that the regular access detection circuitry is seeking to detect can take a variety of forms. The regular access detection circuitry can be arranged to look for any predictable sequence of accesses for which a regular pattern in the memory locations accessed can be detected. The change in memory location does not always need to be the same from one access to the next. For example a predictable pattern such as x, x+8, x+4, x+16, x+12, etc could be detected, given the predictable nature of the pattern. However, in one embodiment, the regular access detection circuitry comprises regular stride detection circuitry for detecting occurrence of a sequence of accesses to data values whose associated memory locations are separated by a regular stride value. The regular stride value can take a variety of forms, and hence for example may have a value of one, indicating a pure sequential sequence of accesses, for example to memory locations, x, x+1, x+2, x+3, etc, or may have a larger value indicating different lengths of stride, for example a sequence of accesses to memory locations x, x+10, x+20, x+30, etc would have a stride value of 10.

In addition, it should be noted that whilst in one embodiment the regular access detection circuitry may actually detect the occurrence of the sequence of accesses by analysing of the memory locations being accessed, in an alternative embodiment the regular access detection circuitry may be provided with an explicit hint indication, for example a hint indication issued by the master device when it is about to initiate a sequence of accesses to data values whose associated memory locations follow a regular pattern. In that example, the regular access detection circuitry may be responsive to the hint indication rather than needing to analyse the memory locations being accessed.

There are a number of ways in which the allocation policy can be altered to increase the likelihood that evicted data is associated with an already activated block of memory locations. In one embodiment, in the absence of detection of the occurrence of said sequence of accesses by the regular access detection circuitry, the allocation circuitry is arranged to employ as said allocation policy a default allocation policy, and whilst the occurrence of said sequence of accesses is detected by the regular access detection circuitry, the allocation circuitry is arranged to employ an alternative allocation policy. The alternative allocation policy is chosen such that use of the alternative allocation policy results in improved usage of already activated blocks of memory locations when evicted data values are written to the memory device when compared with use of the default allocation policy.

In one embodiment the alternative allocation policy may be predetermined. For example, in one embodiment, the cache storage is a set associative storage providing a plurality of cache ways, and the alternative allocation policy identifies at least one way for allocation of data values pertaining to read accesses whilst the occurrence of said sequence of accesses is detected by the regular access detection circuitry, and at least one other way for allocation of data values pertaining to write accesses whilst the occurrence of said sequence of accesses is detected by the regular access detection circuitry. This will ensure that when those read streams and write steams subsequently get evicted to memory, the regular pattern of the accesses will be replicated in the eviction streams passing to memory, resulting in better utilisation of already activated blocks of memory.

The cache storage can be arranged in a variety of ways. In one embodiment, the cache storage comprises a primary storage array and a secondary storage array, when employing the default allocation policy, the allocation circuitry determining said selected cache line from the primary storage array, and when employing the alternative allocation policy, the allocation circuitry determining said selected cache line from the secondary storage array. Hence, in such embodiments, different storage arrays can be used for the default and alternative allocation policies, respectively.

Further, in one embodiment, the alternative allocation policy identifies a first portion of the secondary storage array from which the selected cache line is determined for read accesses, and identifies a second portion of the secondary storage array from which the selected cache line is determined for write accesses. Hence, in such embodiments, when the data is subsequently evicted to memory, this will give rise to much more effective use of already activated blocks of memory.

In one embodiment, rather than having a predetermined alternative allocation policy, the alternative allocation policy may be determined having regard to at least one item of historical allocation data, i.e. providing an indication as to where in the cache previous data has been allocated. Such historical allocation data may in one embodiment merely keep a record for the most recently allocated data, but in alternative embodiments may provide a statistical indication of frequency of accesses into particular parts of the cache.

In one embodiment, the at least one item of historical allocation data is maintained by the regular access detection circuitry and is output to the allocation circuitry upon detection of the occurrence of said sequence of accesses by the regular access detection circuitry, the allocation circuitry being responsive to said at least one item of historical allocation data to determine the alternative allocation policy. In one particular example, such historical allocation data may be maintained within a table by the regular access detection circuitry, with the data held in one of the entries of the table being forwarded to the allocation circuitry for use by the allocation circuitry in determining where to allocate a data value based on the alternative allocation policy. Alternatively, the regular access detection circuitry may itself utilise the at least one item of historical allocation data to determine the alternative allocation policy, with an indication of the alternative allocation policy being output to the regular access detection circuitry.

In one embodiment, the cache storage is a set associate storage providing a plurality of cache ways. In such embodiments, the at least one item of historical allocation data may identify at least one cache way of said plurality of cache ways, and the alternative allocation policy may cause data values to be allocated into said at least one cache way for at least a first period whilst the occurrence of said sequence of accesses is detected by the regular access detection circuitry.

There are various mechanisms that could be used to maintain such historical allocation data. For example, in one embodiment the cache device further comprises: counter circuitry for maintaining, for each way, at least one count value indicative of a number of data values allocated to that way, and the at least one item of historical allocation data comprises an indication as to at least the cache way with the largest count value. Whilst in some embodiments, a single value may be maintained for each way, in an alternative embodiment multiple different count values are provided for each way, with each of those count values being associated with particular instructions or ranges of instructions.

In particular in one embodiment, the cache device further comprises: a regular access detection table incorporating the counter circuitry and maintained by the regular access detection circuitry, the regular access detection table having a plurality of entries, and each entry including a separate count value for each way; execution by said associated master device of an instruction having an instruction address causing the data value to be allocated in the cache storage by the allocation circuitry; and the regular access detection circuitry being responsive to the instruction address to identify one of said entries of the regular access detection table, and to produce as said at least one item of historical allocation data an indication as to the cache way identified in that entry as having the largest count value. Typically, large sequences of accesses to data values whose associated memory locations follow a regular pattern occur as a result of re-execution of the same instruction multiple times, with the address being modified on each iteration of the instruction. Accordingly, such an approach where count values are maintained for individual instructions that have been encountered provides a particularly effective mechanism for identifying appropriate ways into which to allocate subsequent accesses initiated by the same instruction.

As an alternative to the table based approach, the at least one item of historical allocation data may comprise an indication as to a cache way of said plurality of cache ways into which was allocated the data value of the access performed immediately prior to detection of the occurrence of said sequence of accesses by the regular access detection circuitry. Such functionality may be incorporated in the top level cache controller, by merely taking a note of the way in which the last victim cache line was chosen (i.e. the way containing the last selected cache line selected by the allocation circuitry).

Alternatively, the at least one item of historical allocation data may comprise an indication as to a cache way of said plurality of cache ways into which was allocated the data value of the last access performed by the same instruction prior to detection of the occurrence of said sequence of accesses by the regular access detection circuitry. This provides improved accuracy with regard to choosing an appropriate way in which to allocate a sequence of accesses, by keeping information on an instruction-by-instruction basis as to where data was last allocated. However, there will be an additional cost associated with such an approach, when compared with the earlier described approach of merely making a note within the top level cache controller of the way containing the last victim cache line.

In one embodiment, the at least one item of historical allocation data comprises an indication as to at least one cache way of said plurality of cache ways into which data values were allocated during a previous detection of the occurrence of said sequence of accesses by the regular access detection circuitry. This ensures that future allocations are targeted at ways in the cache that already contain data accesses whose addresses follow a regular access pattern.

There are various ways in which the regular stride detection circuitry can identify a sequence of accesses. In one embodiment, the regular stride detection circuitry compares the associated memory location of each data value allocated into the cache storage with the associated memory location of a preceding data value allocated into the cache storage in order to detect the occurrence of a sequence of accesses to data values whose associated memory locations are separated by the regular stride value. In one particular embodiment, the cache device further comprises: a stride detection table maintained by the regular stride detection circuitry, the stride detection table having a plurality of entries, and each entry including an indication of the associated memory location of a preceding data value allocated into the cache and a stride value determined at the time that preceding data value was allocated into the cache; for each data value to be allocated into the cache storage, the regular stride detection circuitry is arranged: (i) to reference a selected one of said entries; (ii) to determine whether the associated memory location of that data value is separated from the associated memory location of the preceding data value identified in the selected entry by said stride value identified in the selected entry; and (iii) to detect the occurrence of a sequence of accesses to data values whose associated memory locations are separated by the regular stride value in dependence on said determination.

In one embodiment, the regular stride detection circuitry is responsive to the instruction address to determine the selected entry to be referenced, each entry stores the instruction address of the instruction causing that entry to be populated, and for each data value to be allocated into the cache, the regular stride detection circuitry is arranged to only perform said determination step (ii) if the instruction address stored in said selected entry matches the instruction address of the instruction causing said data value to be allocated in the cache storage.

In one embodiment, each entry of the stride detection table maintains stride detection indication data, and when the selected entry is referenced by the regular stride detection circuitry, the regular stride detection circuitry is arranged to update the stride detection indication data dependent on whether the associated memory location of the data value being allocated in the cache storage is separated from the associated memory location of the preceding data value identified in the selected entry by said stride value identified in the selected entry or not. This provides a simple and effective mechanism for detecting occurrence of a regular stride during repeated execution of an instruction.

The stride detection indication data can take a variety of forms. In one embodiment, the stride detection indication data is a single bit value which is set to a first value on determination that the associated memory location of the data value being allocated in the cache storage is separated from the associated memory location of the preceding data value identified in the selected entry by said stride value identified in the selected entry, and is set to a second value on determination that the associated memory location of the data value being allocated in the cache storage is not separated from the associated memory location of the preceding data value identified in the selected entry by said stride value identified in the selected entry. Said first value indicates detection of said occurrence of a sequence of accesses to data values whose associated memory locations are separated by the regular stride value, and said second value indicates that said sequence of accesses to data values whose associated memory locations are separated by the regular stride value has not been detected.

In an alternative embodiment, the stride detection indication data is a multi bit value which is modified in dependence on a determination as to whether the associated memory location of the data value being allocated in the cache storage is separated from the associated memory location of the preceding data value identified in the selected entry by said stride value identified in the selected entry, or is not so separated. Hence, in one embodiment, the multi-bit value may be incremented when a regular stride is detected and decremented when a regular stride is not detected. However, it will often be the case that there will be a maximum value and a minimum value associated with the multi-bit value, with the multi-bit value not being incremented above the maximum value and not being decremented below the minimum value. Further, it will be appreciated that the incrementing and decrementing may be by any integer value, not just one. In addition, it will be appreciated that other arrangements may be used, based on organizing the multi-bit value as some other finite state machine predictor instead of a basic counter.

In one embodiment, when the stride detection indication data reaches a predetermined threshold value, the regular stride detection circuitry determines that occurrence of a sequence of accesses to data values whose associated memory locations are separated by said regular stride value has been detected.

Whilst in one embodiment a single stride detection indication data value may be maintained, in another embodiment separate stride detection indication data may be maintained for read accesses and for write accesses.

As mentioned earlier, in one embodiment the regular access detection circuitry may be responsive to a hint signal issued by the associated master device in order to determine the occurrence of a sequence of accesses to data values whose associated memory locations follow a regular pattern. This hint signal may be issued by the associated master device on execution of a predetermined instruction, or alternatively the hint signal may be issued by the associated master device on updating of an item of device state, such an item of device state being for example a control register within the master device.

In one embodiment, the cache device further comprises a storage for storing a global striding mode value which is set upon occurrence of a predetermined event, and whilst the global striding mode value is set, the allocation policy employed by the allocation circuitry is altered from a default allocation policy for all data value to be allocated into the cache. The predetermined event causing the global striding mode value to be set can take a variety of forms. For example, the master device may issue a signal causing the global striding mode to be set, or alternatively the regular access detection circuitry may set the global striding mode once it has detected a sequence of accesses to data values whose associated memory locations follow a regular pattern.

In one embodiment, whilst the global striding mode value is set, a first alternative allocation policy is employed whilst said sequence of accesses is detected by the regular access detection circuitry, and a second alternative allocation policy is employed whilst said sequence of accesses is not detected by the regular access detection circuitry. By such an approach, it can be ensured that the default allocation policy does not disrupt the regularity of the accesses stored in particular parts of the cache when sequences of accesses are detected. For example, a standard default allocation policy may randomly allocate data into ways of the cache, and hence could allocate data into a way which the alternative allocation policy is using for storing accesses associated with a sequence detected by the regular access detection circuitry. However, in accordance with the above embodiment, the second alternative allocation policy can be arranged to exclude such a way from the set of ways which can be allocated into for accesses not associated with the sequence detected by the regular access detection circuitry.

In one embodiment, the cache storage is a set associative storage, the set associative storage providing more than one cache line in which the data value can be stored having regard to its associated memory location. In one particular embodiment, the set associative storage is an n-way set associative storage, providing a choice of n cache lines in which the data value can be stored having regard to its associated memory location.

In one embodiment, the eviction circuitry issues sideband information providing additional information about the data being evicted, the additional data being dependent on the allocation policy employed when that data now being evicted was originally allocated in the cache storage. This additional sideband information may enable a memory controller associated with the memory device to improve the efficiency of use of the memory device, by arranging for various blocks of the memory to be activated, each block being associated with one of the eviction streams as identified by the sideband information. Hence, purely by way of example, the sideband information may identify when the data value being evicted is part of a stream of data being evicted to make way for read data, is part of a stream of evictions taking place to make way for write data, etc. Hence, in such embodiments, if the alternative allocation policy identifies at least one way for allocation of data values pertaining to read accesses whilst the occurrence of said sequence of accesses is detected by the regular access detection circuitry, and at least one other way for allocation of data values pertaining to write accesses whilst the occurrence of said sequence of accesses is detected by the regular access detection circuitry, then the sideband information may identify whether the eviction data is read eviction data, write eviction data or other eviction data dependent on which way the data is being evicted from.

In an alternative embodiment, the eviction circuitry issues sideband information providing additional information about the data being evicted, with the additional data being dependent on historical access behaviour to that data now being evicted. This would enable, for example, data in a cache line to initially be considered as "random", and for its status to then later be changed when a regular access to that cache line is observed, such that its status then changes to "regular", "regular:read", etc.

Viewed from a second aspect, the present invention provides a cache device for use in a data processing apparatus to store data values for access by an associated master device, each data value having an associated memory location in a memory device, the memory device being arranged as a plurality of blocks of memory locations, each block having to be activated before any data value stored in that block can be accessed, the cache device comprising: cache storage means for providing a plurality of cache lines for storing said data values; allocation means, responsive to a data value to be allocated into the cache storage means, for determining which cache line of said plurality of cache lines to store said data value into, the cache storage means for providing more than one cache line in which the data value can be stored, and the allocation means for employing an allocation policy to determine one of said more than one cache line as a selected cache line for storing of said data value; eviction means, responsive to an indication of said selected cache line, for evicting any data value currently stored in said selected cache line, whereby the evicted data value is written into the memory device at the associated memory location if that evicted data value is more up to date than the data value already stored in the memory device at the associated memory location; and regular access detection means for detecting occurrence of a sequence of accesses to data values whose associated memory locations follow a regular pattern; upon detection of the occurrence of said sequence of accesses by the regular access detection means, said allocation policy employed by the allocation means being altered to increase a likelihood that when an evicted data value output by the eviction means is written to the memory device, the associated memory location resides within an already activated block of memory locations.

Viewed from a third aspect, the present invention provides a method of operating a cache device used to store data values for access by an associated master device, each data value having an associated memory location in a memory device, the memory device being arranged as a plurality of blocks of memory locations, each block having to be activated before any data value stored in that block can be accessed, the method comprising: providing a cache storage having a plurality of cache lines for storing said data values; responsive to a data value to be allocated into the cache storage, determining which cache line of said plurality of cache lines to store said data value into, the cache storage providing more than one cache line in which the data value can be stored, and said determining step comprising employing an allocation policy to determine one of said more than one cache line as a selected cache line for storing of said data value; responsive to an indication of said selected cache line, evicting any data value currently stored in said selected cache line, whereby the evicted data value is written into the memory device at the associated memory location if that evicted data value is more up to date than the data value already stored in the memory device at the associated memory location; detecting occurrence of a sequence of accesses to data values whose associated memory locations follow a regular pattern; and upon detection of the occurrence of said sequence of accesses, said allocation policy employed in said determining step being altered to increase a likelihood that when an evicted data value output during the evicting step is written to the memory device, the associated memory location resides within an already activated block of memory locations.

BRIEF DESCRIPTION OF THE DRAWINGS

The present invention will be described further, by way of example only, with reference to embodiments thereof as illustrated in the accompanying drawings, in which:

FIG. 5 schematically illustrates a stride detection table used in accordance with one embodiment;

FIG. 9 schematically illustrates a stride detection table in accordance with an alternative embodiment;

FIG. 11 schematically illustrates a stride detection table in accordance with a further embodiment;

DESCRIPTION OF EMBODIMENTS

Figure 1:
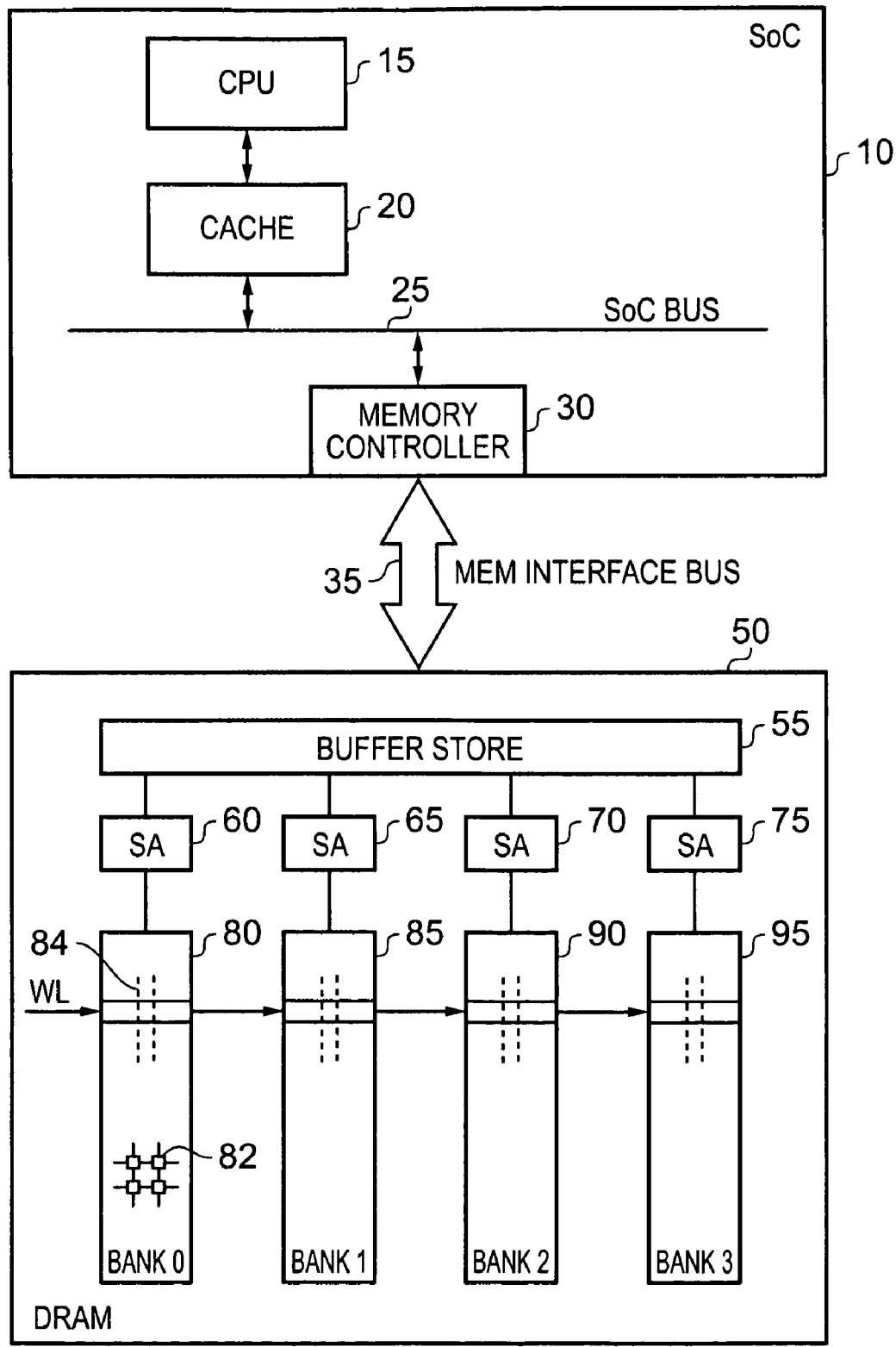
FIG. 1 illustrates a known SoC connected via a memory controller to a DRAM memory.
Figure 2A:
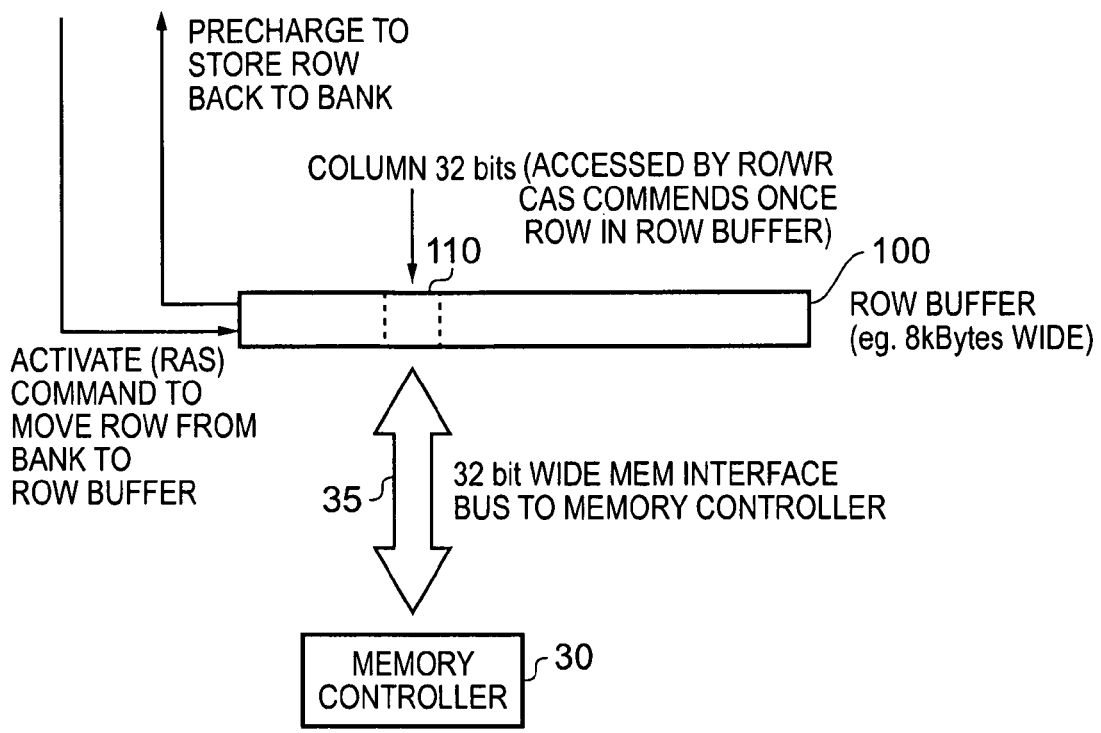
FIG. 2A illustrates the use of a row buffer within a DRAM memory.
Figure 2B:
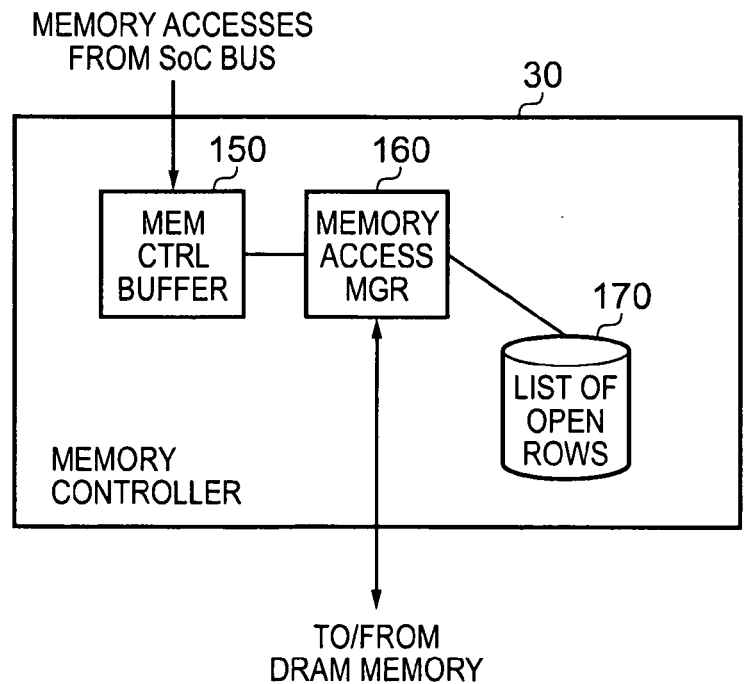
FIG. 2B is a block diagram of a known memory controller.
Figure 3A:
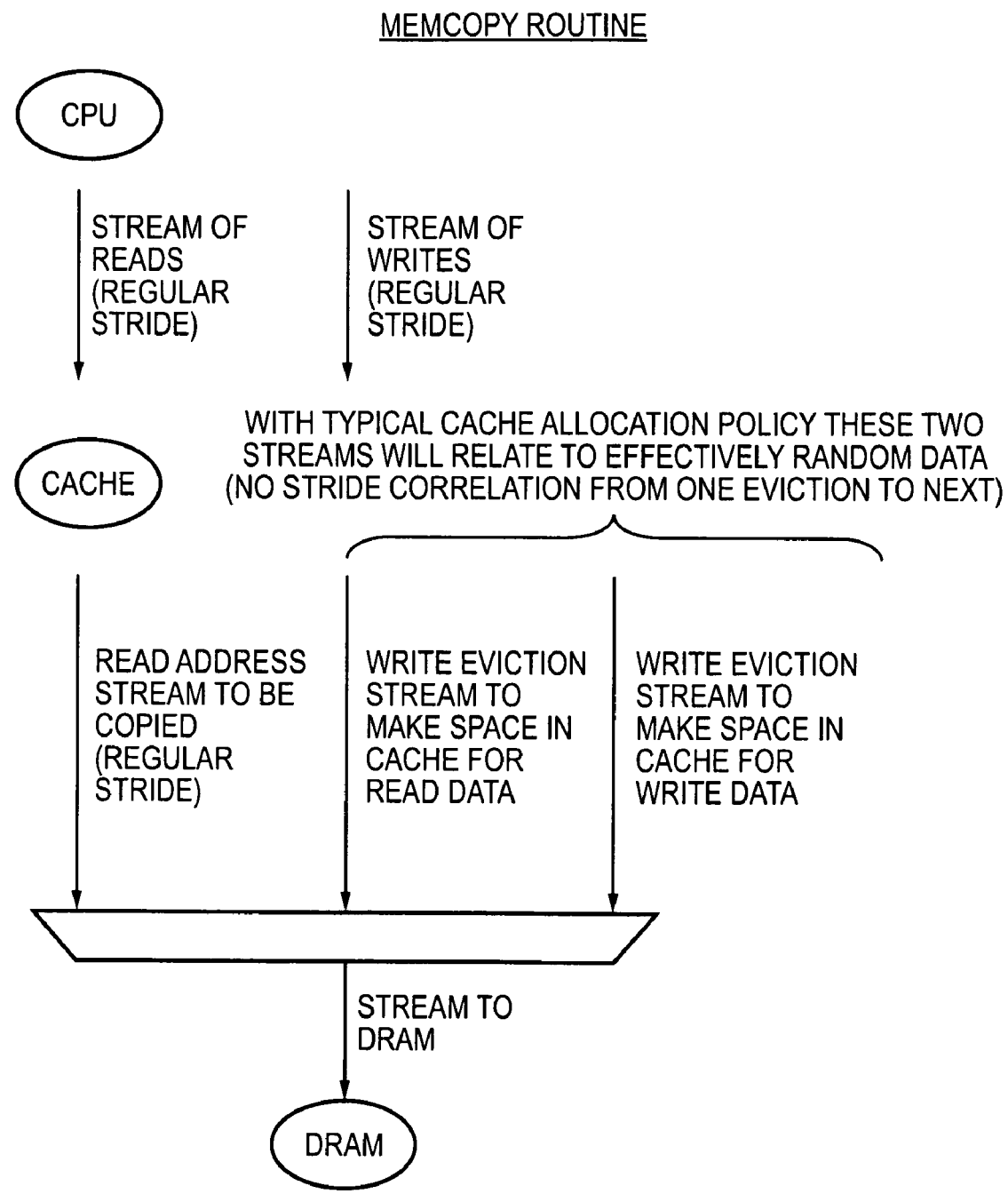
FIG. 3A illustrates the various separate streams of data that are generated to DRAM during a memcpy routine using known techniques.
Figure 3B:
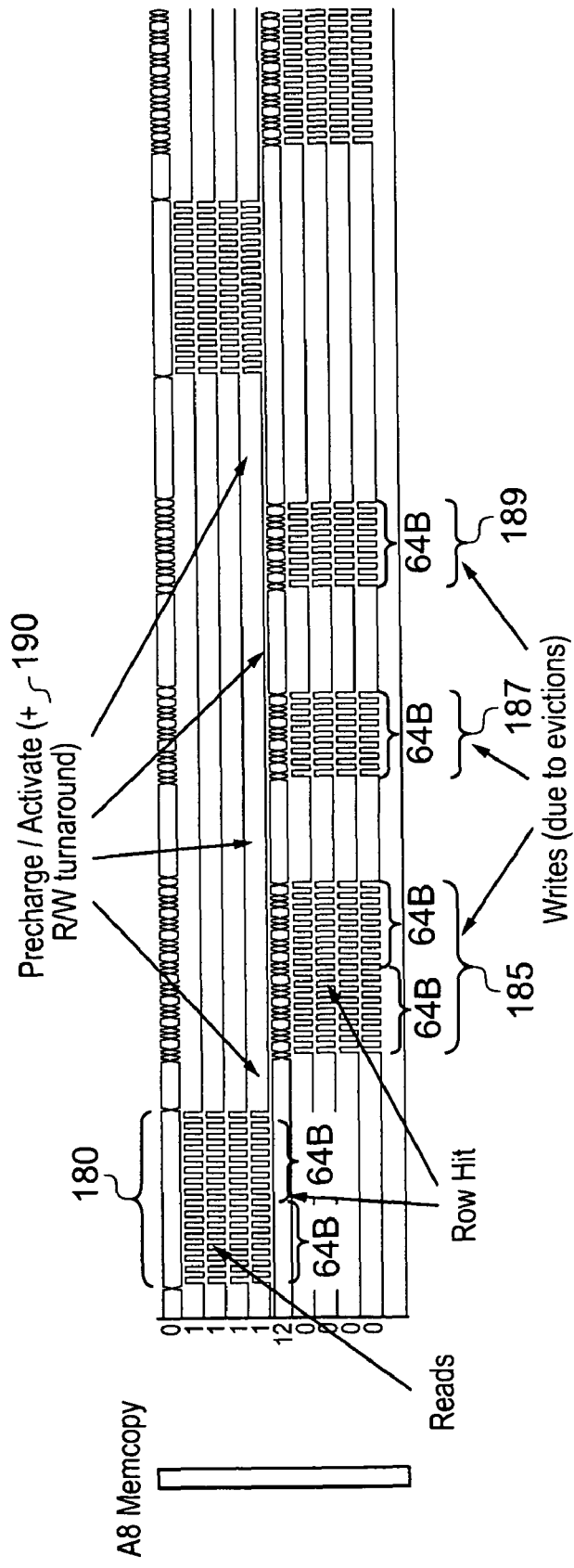
FIG. 3B illustrates the pin activity of a DRAM memory during a memcpy operation in accordance with a known technique.
Figure 4A:
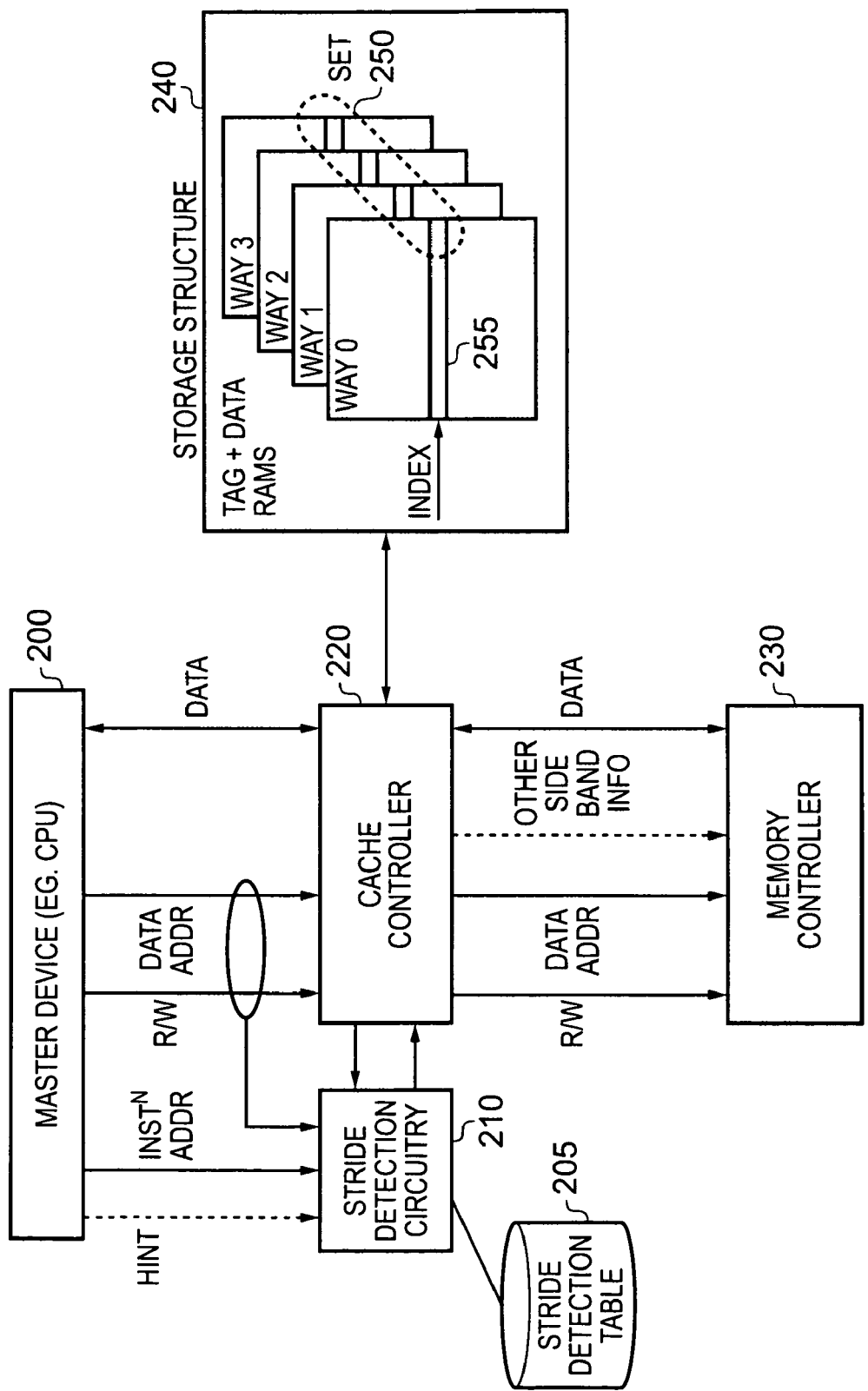
FIG. 4A illustrates a data processing apparatus in accordance with one embodiment.

FIG. 4A is a block diagram illustrating a data processing apparatus in accordance with one embodiment. The various elements shown in FIG. 4A may in one embodiment reside within a SoC, with the memory controller 230 providing an interface from the SoC to a memory, in one embodiment the memory being a DRAM such as the DRAM 50 shown in FIG. 1. As shown in FIG. 4A, a master device 200, for example a CPU, is coupled with the memory controller 230 via a cache structure consisting of a cache controller 220 and the storage structure of the cache 240. In one embodiment, the storage structure 240 takes the form of an n-way set associative storage structure, in the particular example illustrated the storage structure being a four-way set associative storage structure. Typically, tag and data RAMS will be provided for each way, and when the master device 200 issues a request for data, a portion of the data address output by the master device will be used to derive an index into the cache. The index will identify one cache line 255 in each way, with the identified cache lines in each way forming a set 250. As the operation of such an n-way set associative cache will be well understood to those skilled in the art, it will not be discussed further herein.

When the master device 200 issues an access request for data, the data address issued by the master device 200 will be received by the cache controller 220, along with one or more control signals including a read/write (R/W) signal identifying whether the request is a read request or a write request. Assuming the data address relates to a cacheable region of memory, the cache controller 220 will perform a lookup procedure within the storage structure 240 in order to determine whether the data at that address is already stored within the cache. If so, the data will be accessed in the cache, either by writing the data to the cache in the event of a write access, or reading the data from the cache in the event of a read access. In the event of a cache miss, the cache controller 220 will propagate the data address and control signals onto the memory controller 230 in order to access the required data in memory. Typically a linefill operation is invoked on the occurrence of such a cache miss, so that a whole cache line's worth of data (including the data item being accessed by the master device 200) is retrieved and stored within the storage structure 240, and as will be understood by those skilled in the art, this will typically involve the eviction of an existing cache line's worth of data from the storage structure 240 of the cache to memory in order to make room for the data retrieved as part of the linefill operation.

As discussed earlier, there are various activities that may be undertaken by the master device 200 which will result in large sequences of accesses occurring to the DRAM memory. For example, block copy operations such as memcpy and set operations result in large sequences of read and write accesses occurring, where a stream of read accesses having a regular stride, and a stream of write accesses having a regular stride, will be issued by the master device. The accesses may in fact be sequential, such that each subsequent access is to the address following the last access, or the address change between each access may follow some other regular or predictable pattern, for example x, x+10, x+20, x+30, etc. For the following discussion, this latter example sequence will be said to have a stride value of 10, whilst a pure sequential sequence will be said to have a stride value of 1.

As discussed earlier, due to the presence of the cache between the master device and the memory, the streams of accesses presented to the DRAM memory will be significantly different to the streams issued by the master device 200, due to the eviction activity taking place within the cache, and as a result the stream of accesses to the DRAM are less likely to follow any regular stride pattern, given the usual allocation policies applied by a cache when populating the cache lines of the cache with data. Traditional cache allocation policies use schemes such as least recently used (LRU) when populating the cache, and as a result, when data is evicted from the cache, the resultant write eviction streams are effectively random and unlikely to follow any particular pattern with regard to the addresses.

In accordance with one embodiment of the present invention, stride detection circuitry 210 is provided in association with the cache (in one embodiment the stride detection circuitry 210 can be considered to form part of the cache), the stride detection circuitry 210 being operable to seek to detect an occurrence of a sequence of accesses to data values whose associated memory addresses are separated by a regular stride value, and on that detection to cause a change in the cache allocation policy applied by the cache controller when allocating data values into the cache. As will be discussed in more detail later, to assist the stride detection circuitry 210 in detecting such sequences of accesses, the stride detection circuitry 210 will in one embodiment be provided with the instruction address of the instruction whose execution has caused a data access request to be issued by the master device 200, along with the associated data address of that access and the R/W information. This information is used to maintain a stride detection table 205 which can then be referenced in the event of a cache miss to determine whether a stride has been detected, and dependent on that to decide what allocation policy to use when allocating data into the cache in response to the cache miss.

In an alternative embodiment, or in addition to the above mechanism, the stride detection circuitry 210 may receive explicit hint signals from the master device 200 to cause the regular stride detection circuitry to detect occurrence of a sequence of accesses with a regular stride. In one embodiment, such hint signals may be a result of appropriate code added by the programmer to the instruction sequence to be executed by the master device.

As also shown in FIG. 4A, the cache controller may issue other sideband information to the memory controller to assist the memory controller in processing the various accesses sent to it. For example in one embodiment, such sideband information may identify to the memory controller the particular stream that the associated access relates to. For example, such sideband information may identify whether the access is part of a write eviction stream to make space for read data, a write eviction stream to make space for write data, or some other eviction stream.

Figure 4B:
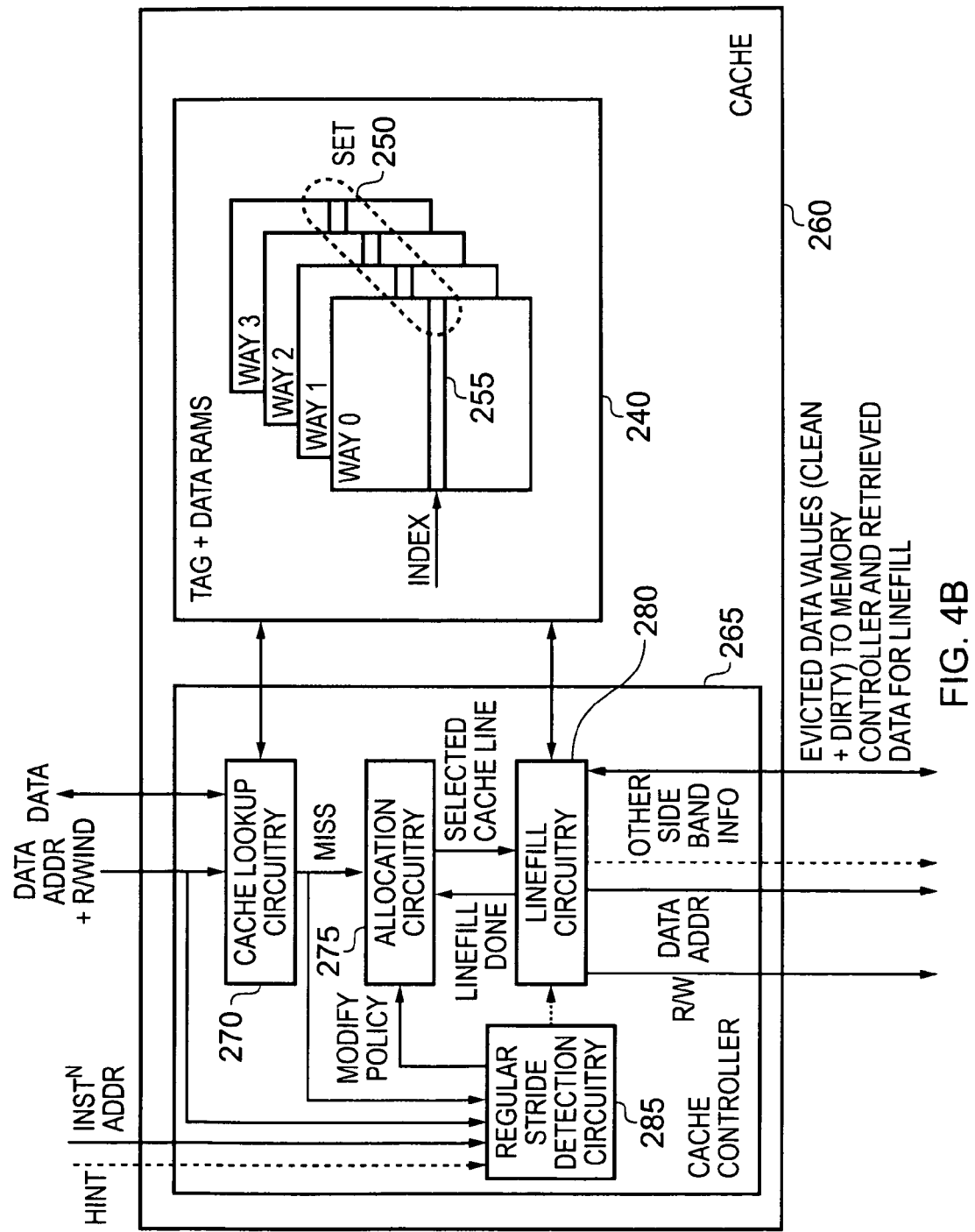
FIG. 4B illustrates in more detail the operation of the cache in accordance with one embodiment.

FIG. 4B schematically illustrates the components of the cache in accordance with one embodiment. The cache 260 consists of the storage structure 240 which is the same as that shown in FIG. 4A, along with the cache controller 265. The cache controller 265 is essentially the same as the cache controller 220 shown in FIG. 4A, but in this example the cache controller incorporates the regular stride detection circuitry 285. The regular stride detection circuitry 285 performs the same function as the stride detection circuitry 210 shown in FIG. 4A.

The cache controller essentially consists of cache lookup circuitry 270, allocation circuitry 275 and linefill circuitry 280. When a cacheable access request is issued by the master device 200, the cache lookup circuitry 270 performs a lookup in the data structure 240, and in the event of a cache hit the data is then accessed in the cache. However, in the event of a cache miss, that cache miss indication is passed to the allocation circuitry 275, and also to the regular stride detection circuitry 285, the regular stride detection circuitry 285 also receiving the various other signals already discussed with reference to FIG. 4A. The allocation circuitry 275 is responsive to the cache miss indication to apply an allocation policy in order to identify a selected cache line into which the data being requested by the master device should be retrieved from the memory. An indication of this selected cache line is then passed to the linefill circuitry 280 which will perform an eviction process to evict the current contents of that selected cache line if the current contents are both valid (also referred to as clean) and dirty (i.e. are more up to date than the value(s) stored in memory). The linefill circuitry 280 will also retrieve a new cache line's worth of data, including the data value requested by the master device, for storing into the selected cache line. When this process has been completed, a linefill done signal is returned to the allocation circuitry 275.

In the absence of detection of a sequence of accesses having a regular stride, the allocation circuitry 275 will apply a default allocation policy, for example an LRU policy, in order to determine which cache line should form the selected cache line. In accordance with such a policy, the cache line within the relevant set that has been least recently accessed will be chosen as the selected cache line (also referred to as the victim cache line). However, in the event that the access giving rise to the miss is detected to be part of a stream of accesses with a regular stride, then the regular stride detection circuitry 285 will issue a signal to the allocation circuitry 275 to cause the allocation policy to be modified. In one embodiment, the signal from the regular stride detection circuitry to the allocation circuitry in such a situation will cause the allocation circuitry to switch to a predetermined alternative allocation policy. For example, this alternative allocation policy may identify a particular way into which data values should be allocated. In one particular embodiment, one way may be identified for allocation of read data values, whilst a different way may be identified for allocation of write data values. When considering large sequences of accesses with a regular stride, such an approach will ensure that the regular nature of the accesses is also reflected in the streams of evictions taking place to the DRAM, since the write eviction stream that occurs to make space for read data will then occur from a particular way, and similarly the write eviction stream used to make space for write data will also occur from another particular way of the cache. Since the allocation policy will have ensured that those ways are populated with the read data of read accesses with a regular stride and the write data of write accesses with a regular stride, respectively, the regular stride nature of the accesses will also be replicated in the different write eviction streams. This will by its nature increase the efficiency of the operation of the DRAM, by reducing the number of precharge and activate commands needed.

In an alternative embodiment, the alternative allocation policy will not be predetermined, but instead the regular stride detection circuitry 285 will maintain a stride detection table, such as the stride detection table 205 illustrated schematically in FIG. 4A, with that stride detection table being used to maintain at least one item of historical allocation data which can then be output to the allocation circuitry upon detection of a sequence of accesses with a regular stride, with the historical allocation data being used by the allocation circuitry in order to decide the alternative allocation policy (i.e. from which way to choose the selected cache line). In an alternative embodiment, this historical allocation data may be used directly by the regular stride detection circuitry to determine the alternative allocation policy, with the allocation circuitry 275 then merely applying that alternative allocation policy in order to choose the selected cache line.

In one embodiment, the stride detection table may be a simple table merely identifying the cache way into which was allocated the data value of the access performed immediately prior to detection of the sequence of accesses with a regular stride. However, in an alternative embodiment, the stride detection table has multiple entries, each entry corresponding to an instruction address or range of instruction addresses, with a stride detection indication being maintained for each such entry. Optionally, such a multi-entry table may also identify a cache way into which data should be allocated once a regular stride has been detected in respect of accesses issued by an instruction associated with that entry. This may for example identify the cache way into which was allocated the data value of the last access performed by the same instruction prior to the detection of the occurrence of the sequence of accesses with a regular stride.

In some embodiments, the regular stride detection circuitry 285 may also communicate with the linefill circuitry 280, as shown by the dotted line in FIG. 4B. This would allow, for example, the provision of metadata to the linefill circuitry from the regular stride detection circuitry for storing in association with a cache line of data as that data is established in the cache, so as for example to identify whether that cache line stores data which is considered "random", "regular: read", regular:write", etc.

Whilst the regular stride detection circuitry 285 represents additional complexity added to the cache controller, it has been found that this additional complexity is significantly outweighed by the performance and power consumption benefits that can be realised as a result of changing the allocation policy on detection of a sequence of accesses with a regular stride, due to the increased efficiency of utilisation of the memory interface bus 35, and the resulting performance gains and power consumption reductions. Further, it has been found that in some instances existing circuitry provided in order to perform prefetching operations can be re-utilised to implement some of the functionality of the regular stride detection circuitry. In particular, such prefetch circuitry often implement stride detection/prediction schemes, as for example discussed in the article "Effectiveness of Hardware-Based Stride and Sequential Prefetching in Shared-Memory Multiprocessors", by F Dahlgren et al, HPCA, Proceedings of the 1st IEEE Symposium on High-Performance Computer Architecture, Page 68, 1995, ISBN: 0-8186-6445-2.

FIG. 5 schematically illustrates a stride detection table that may be used in accordance with one embodiment. In particular, FIG. 5 illustrates a direct mapped stride detection table with a stride detection indication provided for each entry. The parameter SD_SIZE identifies the number of entries in the table, and an index 310 is generated into the table having regard to the instruction address and the number of entries. In one embodiment the instruction address is hashed with the SD_SIZE parameter in order to identify a particular entry associated with that instruction address.

Each entry maintains four fields, the first field identifying an instruction address, the second field identifying a data address, the third field identifying a stride value, and the fourth field identifying a stride detection indication. The stride detection indication may in some embodiments be a multi-bit value, in effect providing a confidence value as to whether a stride has been detected, but in an alternative embodiment the stride detection indication may merely be a single bit predictor, such that a first value of the stride detection indication indicates that a stride has not been detected, and the other value indicates that a stride has been detected.

Figure 6:
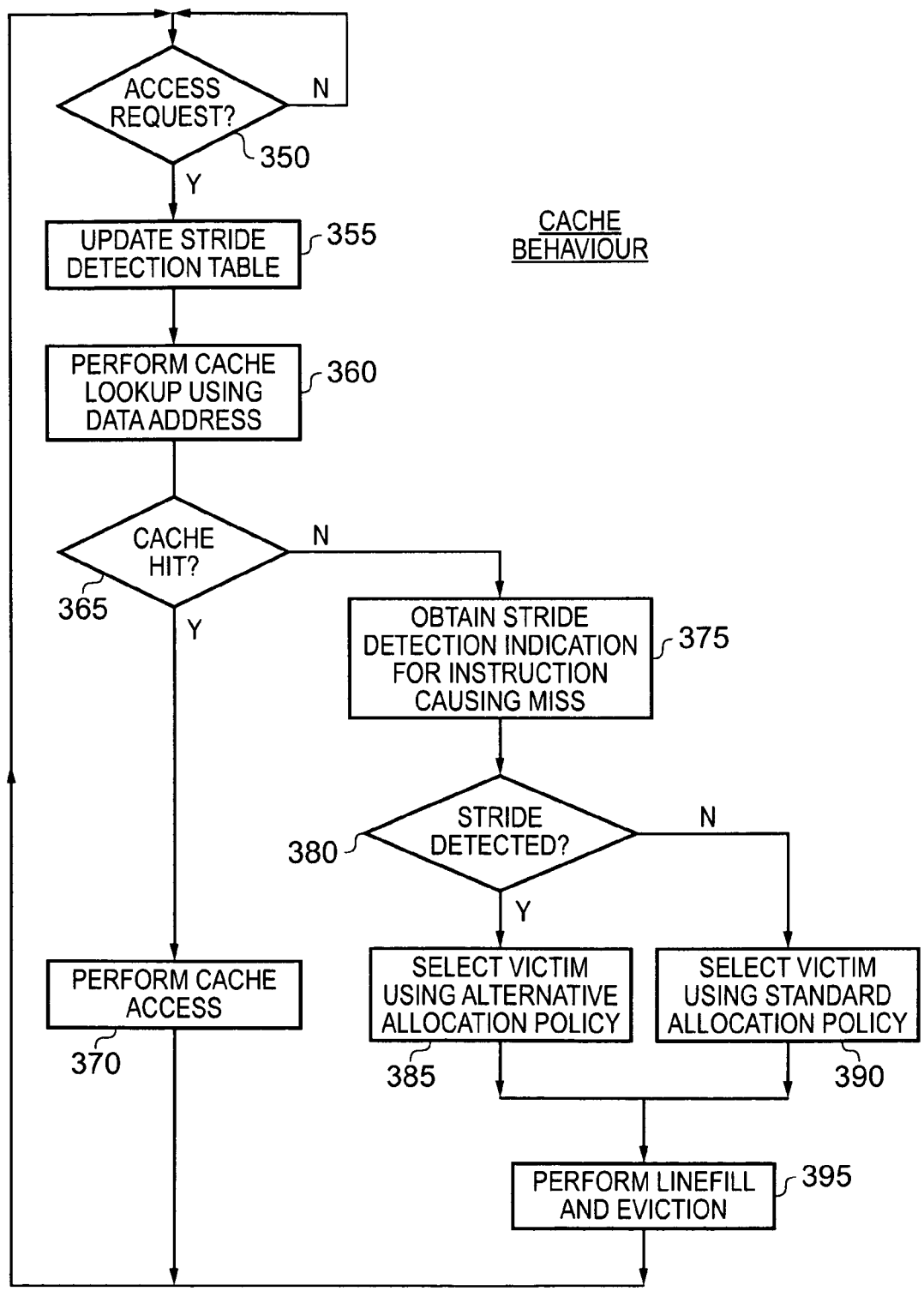
FIG. 6 is a flow diagram illustrating the behaviour of the cache in accordance with one embodiment.
Figure 7:
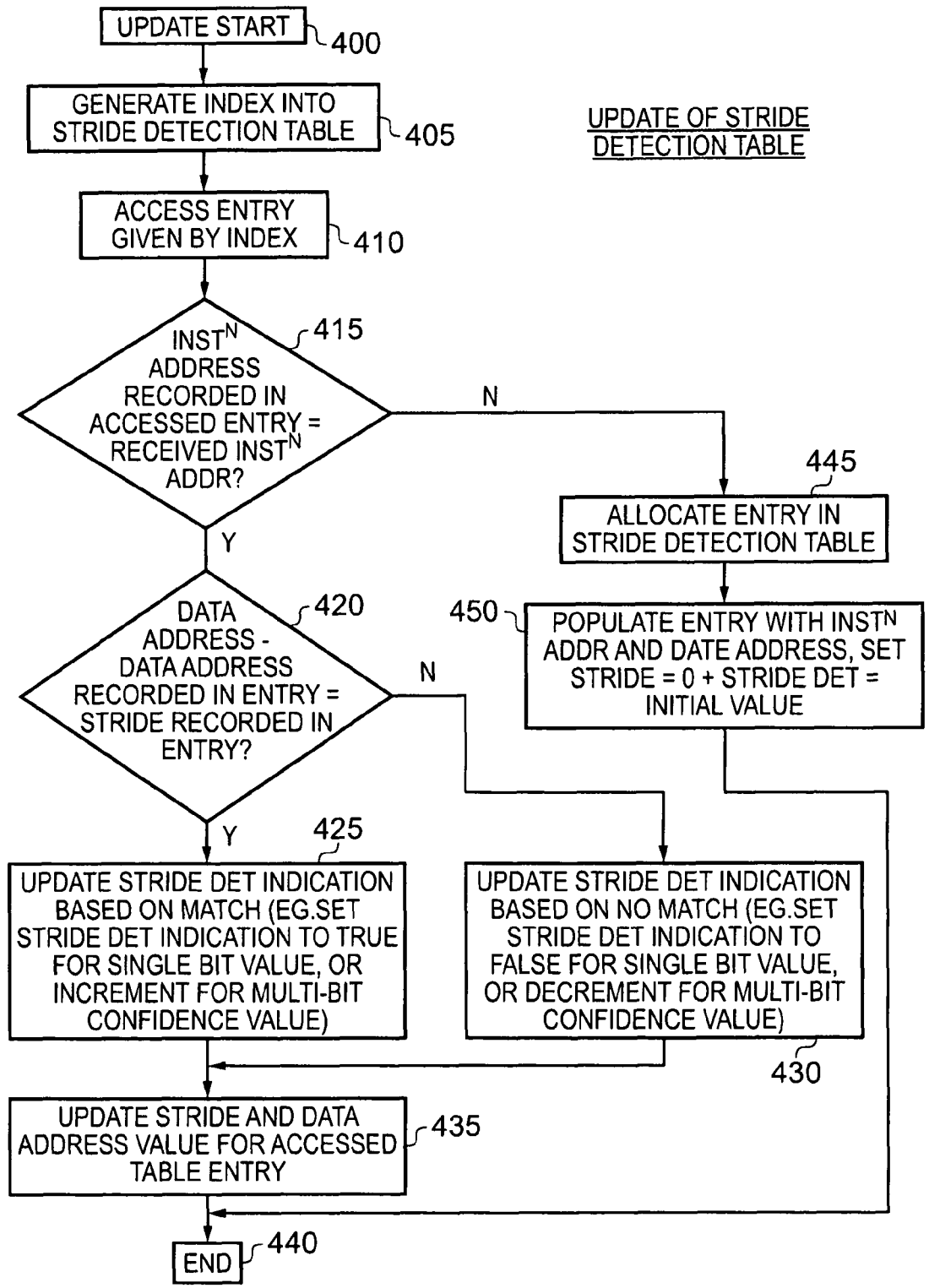
FIG. 7 is a flow diagram illustrating how the stride detection table is updated in accordance with one embodiment.
Figure 8:
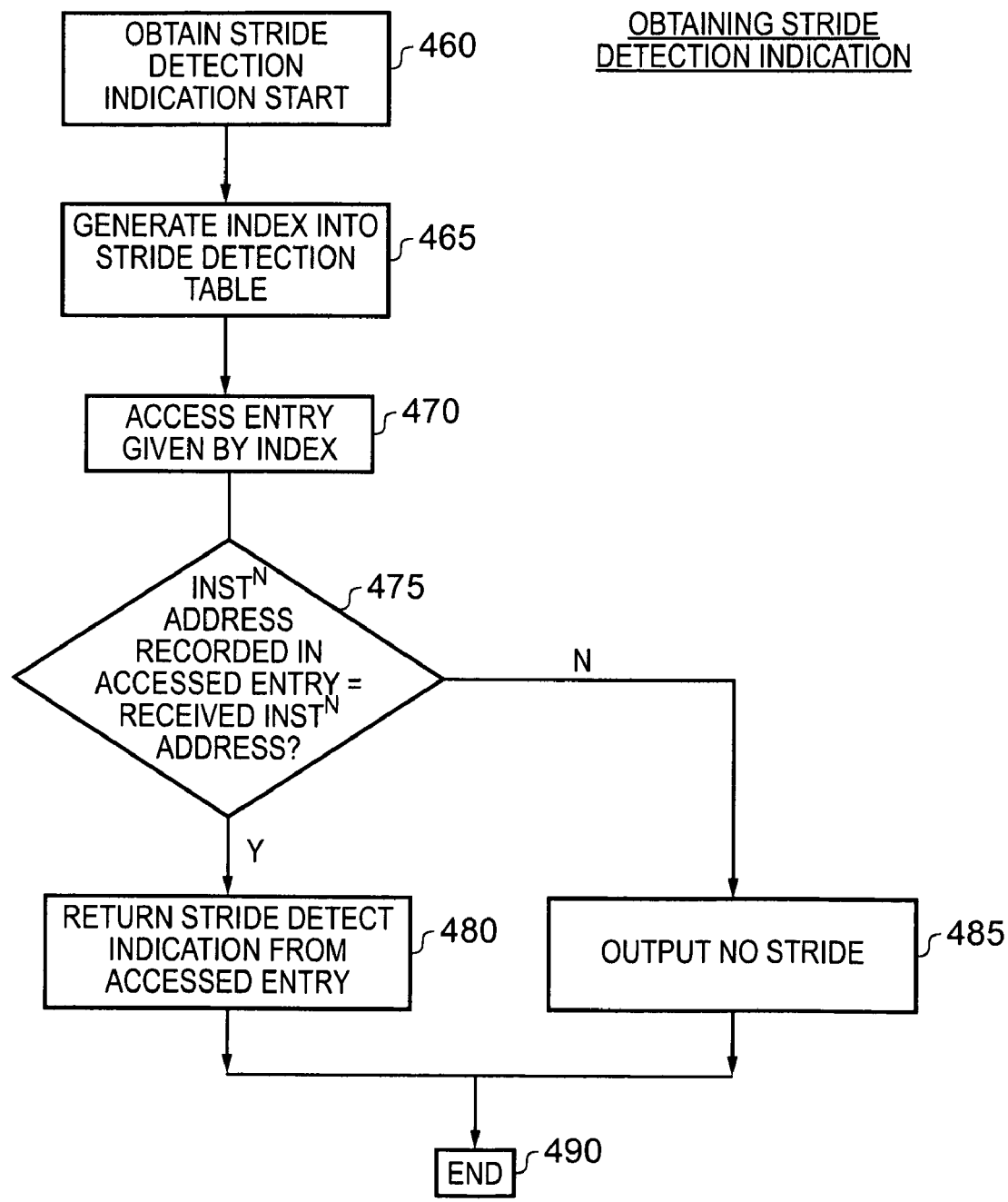
FIG. 8 is a flow diagram illustrating how a stride detection indication may be obtained from the stride detection table in accordance with one embodiment.

In FIGS. 7 and 8, more details as to how the stride detection table of FIG. 5 is utilised will be provided, but first the basic behaviour of the cache in accordance with one embodiment will be described with reference to FIG. 6.

At step 350, the issuance of an access request from the master device 200 is awaited, and on receipt of such an access request by the cache 260, the stride detection table is updated at step 355, the process of updating the stride detection table being described in more detail later with reference to FIG. 7. Thereafter, at step 360, a cache lookup is performed using the data address in order to determine whether the data being accessed is already present in the cache.

Accordingly, it is determined at step 365 whether a cache hit has occurred, and if so the cache access is performed at step 370, with the process then returning to step 350.

However, if a cache hit is not detected, i.e. a cache miss has occurred, then the process proceeds to step 375 where a stride detection indication is obtained from the stride detection table for the instruction whose access caused a cache miss to occur. This process will be described in more detail later with reference to FIG. 8.

It is then determined at step 380 whether a stride has been detected, and if so the process proceeds to step 385 where a victim cache line is selected using an alternative allocation policy. However, if a stride is not detected, then the process proceeds to step 390, where a victim cache line is selected using a standard allocation policy, for example a least recently used policy or a random selection policy. Once the victim cache line has been selected by either steps 385 or 390, then a linefill and eviction operation is performed at step 395 by the linefill circuitry 280, with the process then returning to step 350.

This top level cache behaviour can be represented by the following pseudo-code:

```
//
// Top Level Cache Behaviour
// ========================
// This describes how the cache is looked up, performing read or write
// behaviours in the event of a cache hit. In the event of a cache
// miss, a victim is selected prior to a linefill being performed. The
// victim selection is adapted based on whether stride behaviour is
// detected.
//
int     inst_addr;    // Instruction Address
int     data_addr;    // Data Address
bool    do_access;    // Access / No Access
bool    readnwrite;   // Read / Not Write
if (do_access) {
    bool hit = FALSE;
    // Update Stride Detector Table
    update_stride_det_table(inst_addr, data_addr);
    // Cache Lookup
    hit = CacheLookup(data_addr);
    // Cache Hit
    if (hit) {
        CacheHitDoAccess(data_addr, readnwrite);
    // Cache Miss
    } else {
        if (get_stride_det(inst_addr)) {
```

```
            int victim_way = SelectVictimAlternate(inst_addr,
                                      data_addr, readnwrite);
            DoEvictAndLineFill (inst_addr, data_addr, readnwrite,
                victim_way);
    } else {
            int victim_way = SelectVictimStandard(inst_addr,
                                      data_addr, readnwrite);
            DoEvictAndLineFill(inst_addr, data_addr, readnwrite,
                victim_way);
        }
    }
}
```

There are various standard allocation policies that could be used at step 390. The following pseudo-code illustrates just one example standard victim way selection that may be employed:

```
//
// Example Standard Victim Way Selection
// =====================================
//
int SelectVictimStandard (int inst_addr, int data_addr, bool readnwrite) {
    return rand( ) % N_CACHE_WAYS;
}
```

In accordance with this technique, the cache way containing the victim cache line is selected randomly having regard to the total number of cache ways. As mentioned earlier, in an alternative embodiment a record can be kept of the use of cache lines within each set, with the least recently used cache line being selected as the victim cache line.

Having regard to the alternative allocation policy adopted at step 385, there can again be a variety of allocation policies chosen, but as discussed earlier the intention of the alternative allocation policy is to seek to improve the regular nature of data subsequently output to the DRAM memory, so as to improve the likelihood that data accesses occur within an already activated DRAM row, thereby reducing the number of activate and precharge operations required. The following pseudo-code illustrates one example of the alternative victim way selection where way zero is used for read accesses and way one is used for write accesses when it is determined at step 380 that a regular stride has been detected:

```
//
// Example Alternate Victim Way Selection
// ======================================
// This example uses fixed ways for read and write streams.
//
int SelectVictimAlternate (int inst_addr, int data_addr, bool readnwrite) {
    if (readnwrite) {
        return 0;
    } else {
        return 1;
    }
}
```

In an alternative embodiment, the functionality of the top level cache controller may be modified to keep a note of the way in which the last victim cache line was selected, and to incorporate that information into the alternative victim way selection. In such an embodiment, the last part of the top level cache behaviour pseudo-code illustrated earlier can be rewritten as follows:

```
int last_victim_way = 0;
...
// Cache Miss
} else {
    if (get_stride_det(inst_addr)) {
            int victim_way = SelectVictimAlternate(inst_addr,
                data_addr,
                    readnwrite, last_victim_way);
            DoEvictAndLineFill(inst_addr, data_addr, readnwrite,
                    victim_way);
            last_victim_way = victim_way;
    } else {
            int victim_way = SelectVictimStandard(inst_addr,
                data_addr,
                    readnwrite);
            DoEvictAndLineFill(inst_addr, data_addr, readnwrite,
                victim_way);
            last_victim_way = victim_way;
    }
}
```

As can be seen from the pseudo-code, the "last_victim_way" value maintained globally by the top level cache controller is factored into the SelectVictimAlternate procedure, and following the eviction and linefill, the victim way that was chosen becomes the new last_victim_way value. Similarly, if the standard victim process is performed, then again the victim way that is selected becomes the new last_victim_way value.

In one embodiment, the alternative victim selection process may merely take the last_victim_way value and choose that to be the victim way, but in alternative embodiments the last_victim_way value may merely be factored in with other considerations in deciding the victim way.

FIG. 7 is a flow diagram illustrating how the stride detection table of FIG. 5 is updated at step 355 of FIG. 6. At step 400, the update process starts, whereafter at step 405 an index into the stride detection table is generated based on the instruction address of the instruction which caused the data access request to be issued. Thereafter, at step 410, the entry given by that index is accessed. At step 415, it is determined whether the instruction address recorded in the instruction address field of the entry is the same as the instruction address from which the index was generated at step 405. If it is, then this indicates that the entry is associated with the instruction, and can be used to assess whether a regular stride has been detected. Accordingly, the process proceeds to step 420, where the data address of the access is subtracted from the data address recorded in the entry, and the resulting value is compared with the stride value recorded in the entry. If these two values are the same, then this indicates that a regular stride has been detected, and accordingly the process proceeds to step 425 where the stride detection indication is updated based on the match. For a single bit stride detection indication this will typically involve setting the value to true (e.g. a logic one value) or for a multi-bit confidence value may involve incrementing the counter. Obviously if the multi-bit counter has reached a maximum value, no incrementing will occur at step 425.

Similarly, if the two values do not match at step 420, then this indicates that a stride has not been detected for the current access, and accordingly the process branches to step 430 where the stride detection indication is again updated based on the lack of a match being determined at step 420. This may for example involve setting the stride detection indication to false in the event of a single bit value, or decrementing the multi-bit confidence value in the event of a multi-bit value.

Following steps 425 or 430, then the process returns to step 435, where the stride value and data address value for the accessed table entry are updated. In particular, the stride value will be recorded as the difference between the current data address and the data address already stored in the entry, and the data address will be updated to identify the current data address.

If at step 415 it was determined that the instruction address recorded in the accessed entry does not match the instruction address of the current instruction giving rise to the access, then this means that the accessed entry does not relate to the current instruction. Accordingly, at step 445, an entry is allocated in the stride detection table for the current instruction address, typically by overwriting the current contents of the indexed entry. The entry is then populated with the current instruction address, the current data address, the stride value is initialized to zero, and the stride detection indication is set to an initial value. This initial value will typically be a value associated with a false condition, e.g. a logic zero value for a single bit stride detection indication. Following step 450, the process ends at step 440.

The following pseudo-code illustrates how the stride detection table of FIG. 5 can be established:

```
// State
// -----
// Stride Detector Entry
typedef struct sd_e {
    int     inst_addr;    // Address of instruction being tracked
    int     data_addr;    // Last address accessed by instruction
    int     stride;       // Stride from Last - 1 access
    bool    stride_det;   // Striding access detected
} sd_e;
// Persistant storage, table of SD_SIZE sd_e entries
sd_e sd[SD_SIZE];
```

Further, the following pseudo-code illustrates now the functionality of FIG. 7 may be implemented in one embodiment:

```
// Function to update SD table
void update_stride_det_table (int inst_addr, int data_addr) {
    int index  = inst_addr         // hash instruction address to
                 % SD_SIZE;        // get location in direct mapped sd
                                   // table
    // inst_addr previously encountered?
    if (sd[index].inst_addr == inst_addr) {
        if ((data addr - sd[index].data_addr) ==
            sd[index].stride) {
            sd[index].stride_det    = TRUE;
        } else {
            sd[index].stride_det    = FALSE;
        }
        // Record stride and data address for next time
        sd[index].stride      = data_addr - sd[index].data_addr;
        sd[index].data_addr   = data_addr;
    } else {
        // allocate entry for non-resident inst_addr
        sd[index].inst_addr   = inst_addr;
        sd[index].data_addr   = data_addr;
        sd[index].stride      = 0;
        sd[index].stride_det  = FALSE;
    }
}
```

In the above pseudo-code, it is assumed that the stride detection indication is a single bit value.

FIG. 8 illustrates how a stride detection indication can be obtained at step 375 of FIG. 6 in accordance with one embodiment. At step 460, the process is started, whereafter at step 465 an index is generated into the stride detection table based on the instruction address that resulted in the data access under consideration. Then, at step 470 the entry given by the index is accessed.

At step 475, it is determined whether the instruction address recorded in the accessed entry matches the current instruction address, and if so the stride detection indication stored in the accessed entry is returned at step 480. Otherwise, the process proceeds to step 485, where a signal is output indicating that no stride has been detected. Thereafter, the process ends at step 490. The following pseudo-code illustrates how the functionality of FIG. 8 may be implemented in accordance with one embodiment:

```
// Function to return stride detected status based on instruction address
bool get_stride_det (int inst_addr) {
    int index  = inst_addr         // hash instruction address to
                 % SD_SIZE;        // get location in direct mapped sd
                                   // table
    if (sd[index].inst_addr == inst_addr) {
        return sd[index].stride_det;
    } else {
        return FALSE;
    }
}
```

FIG. 9 illustrates an alternative form of stride detection table to that shown in FIG. 5, where in addition to a general stride detection indication, stride detection indications are also separately maintained for read accesses and for write accesses. Accordingly, as shown, the stride detection table 500 has a plurality of entries 505, with an index 510 being generated based on a current instruction address in order to identify one of the entries in the table. In addition to the three stride detection indications discussed above, the table also differs from the table 300 of FIG. 5 in that a last direction field is included identifying whether the last access causing that entry to be populated was a read access or a write access.

Figure 10:
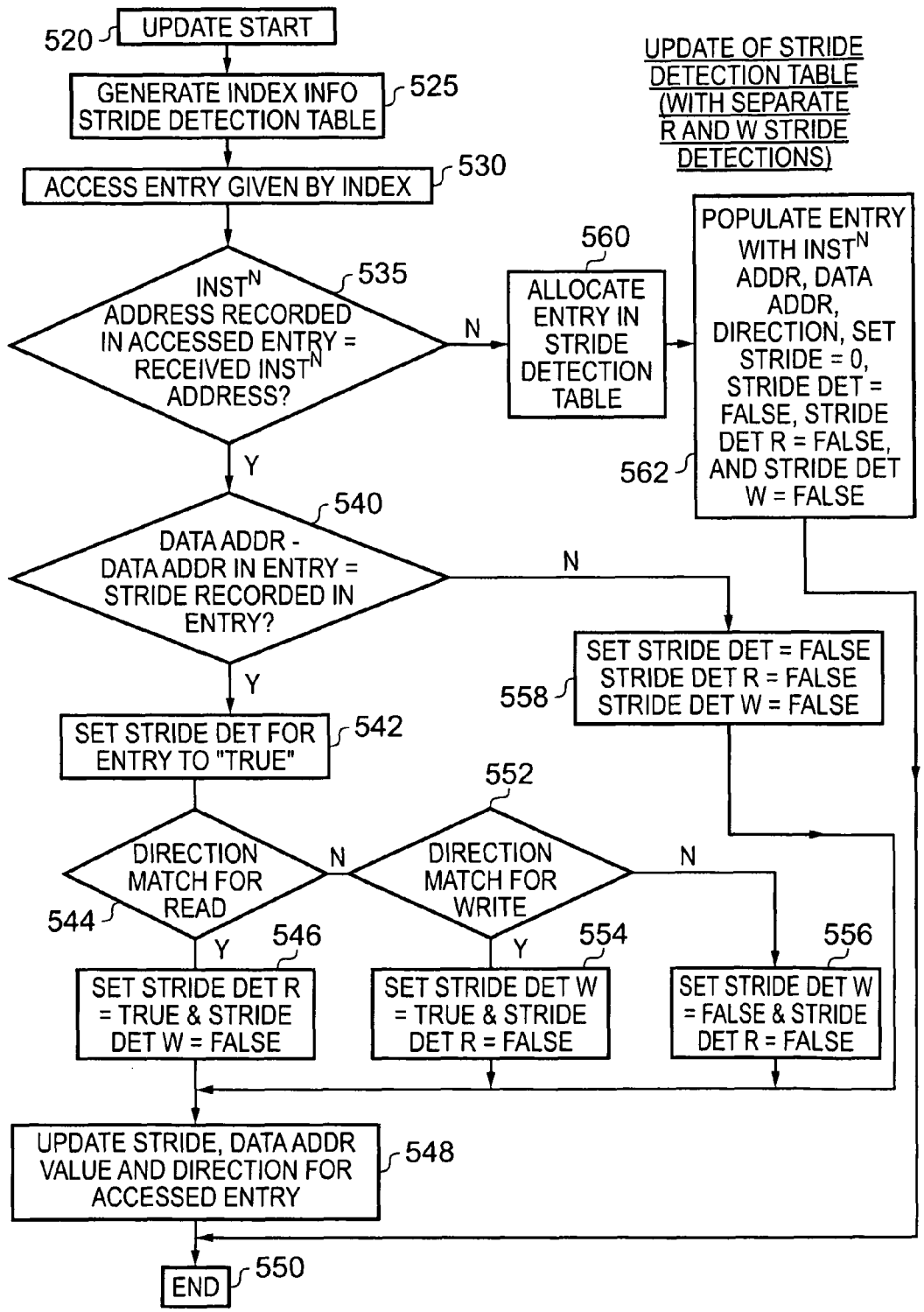
FIG. 10 is a flow diagram illustrating how the stride detection table of FIG. 9 is updated in accordance with one embodiment.

When using the stride detection table of FIG. 9, the cache behaviour again follows the sequence of steps shown in FIG. 6. FIG. 10 illustrates the steps performed in order to perform an update of the stride detection table at step 355 of FIG. 6 when using the stride detection table of FIG. 9.

As shown in FIG. 10, the process starts at step 520, whereafter an index is generated into the stride detection table at step 525 and that indexed entry is then accessed at step 530, steps 525 and 530 corresponding to steps 405 and 410 of FIG. 7. Similarly, steps 535 and 540 correspond with steps 415 and 420 of FIG. 7, determining whether the current instruction address matches the instruction address in the entry, and whether the difference in the data addresses matches the stride value already recorded in the entry, respectively. Assuming the "yes" branch is followed from both steps 535 and 540, then the general stride detect value is set to true, at step 542. The process then proceeds to step 544, where it is determined whether there is a direction match for a read access, i.e. whether the current access is a read access and the last direction field indicates that the last access was also a read access. If so, then the process proceeds to step 546 where the stride detection indication for a read is set to equal to true, and the stride detection indication for a write is set to equal to false.

Similarly, if no direction match for a read is detected at step 544, it is determined whether there is a direction match for a write at step 552, i.e. whether the current access is a write and the last direction field indicates that the last access was also a write. If so, then the stride detection indication for a write is set equal to true and the stride detection indication for a read is set equal to false. If neither steps 544 or 552 produce a match, then at step 556 both the stride detection indication for a write and the stride detection indication for a read is set equal to false.

Following the performance of steps 546, 554 or 556 the process proceeds to step 548 where the stride and data address values are updated in an analogous manner to that discussed earlier with reference to step 435 of FIG. 7. In addition, the direction field is updated to identify whether the current access is a read or a write access. Thereafter, the process ends at step 550.

If at step 535, the instruction address does not match the instruction address in the accessed entry, then steps 560 and 562 are performed, these corresponding with steps 445 and 450 of FIG. 7. However, at step 562 some additional fields are populated when compared with step 450 of FIG. 7. In particular, all three stride detection indications are set equal to false. Following step 562, the process ends at step 550.

The following pseudo-code illustrates how the stride detection table of FIG. 9 can be constructed in accordance with one embodiment:

```
// State
// -----
// Stride Detector Entry
typedef struct sd_e {
    int     inst_addr;      // Address of instruction being tracked
    int     data_addr;      // Last address accessed by instruction
    bool    readnwrite;     // Last direction
    int     stride;         // Stride from Last - 1 access
    bool    stride_det;     // Striding access detected
    bool    stride_det_r;   // Striding access detected - reads
    bool    stride_det_w;   // Striding access detected - writes
} sd_e;
// Persistent storage, table of SD_SIZE sd_e entries
sd_e sd[SD_SIZE];
```

Further, the following pseudo-code illustrates how the process of FIG. 10 can be implemented in one embodiment:

```
// Function to update SD table
void update_stride_det_table (int inst_addr, int data_addr, bool readnwrite)
{
    int index    = inst_addr % SD_SIZE;         // hash instruction address to
                                                // get location in direct mapped sd
                                                // table
    // inst_addr previously encountered?
    if (sd[index].inst_addr == inst_addr) {
        if ((data_addr - sd[index].data_addr) == sd[index].stride) {
            sd[index].stride_det = TRUE;
            // Read bias
            if (sd[index].readnwrite == TRUE && readnwrite == TRUE) {
                sd[index].stride_det_r      = TRUE;
                sd[index].stride_det_w      = FALSE;
            // Write bias
            } else if (sd(index).readnwrite == FALSE && readnwrite == FALSE) {
                sd[index].stride_det_r      = FALSE;
                sd[index].stride_det_w      = TRUE;
            // No bias
            } else {
                sd[index].stride_det_r      = FALSE;
                sd[index].stride_det_w      = FALSE;
            }
        // No stride detected
        } else {
            sd[index].stride_det            = FALSE;
            sd[index].stride_det_r          = FALSE;
            sd[index].stride_det_w          = FALSE;
        }
        // Record stride and data address for next time
        sd[index].stride                    = data_addr - sd[index].data_addr;
        sd[index].data_addr                 = data_addr;
        sd[index].readnwrite                = readnwrite;
    } else {
        // allocate entry for non-resident inst_addr
        sd[index].inst_addr                 = inst_addr;
        sd[index].data_addr                 = data_addr;
        sd[index].readnwrite                = readnwrite;
        sd[index].stride                    = 0;
        sd[index].stride_det                = FALSE;
        sd[index].stride_det_r              = FALSE;
        sd[index].stride_det_w              = FALSE;
    }
}
```

In FIG. 10, it is assumed that the stride detection indications are all single bit values that are either set to true or false. However, it will be understood that these values could also be multi-bit values which are either incremented or decremented dependent on the match results (e.g. for "true" read "increment" and for "false" read "decrement").

As regards the mechanism for obtaining the stride detection indications, this is performed generally using the process of FIG. 8, with each of the general stride indication, the stride indication for read and the stride indication for write being separately accessible. The following pseudo-code schematically illustrates the three functions that can be used to return these three different stride detection indications:

```
// Function to return stride detected status based on instruction address
bool get_stride_det (int inst_addr) {
        int index    = inst_addr          // hash instruction address to
                     % SD_SIZE;           // get location in direct mapped sd
                                          // table
        if (sd[index].inst_addr == inst_addr) {
               return sd[index].stride_det;
        } else {
               return FALSE;
        }
}
// Function to return stride detected status (for read) based on instruction
```

-continued

```
address
bool get_stride_det_r (int inst_addr) {
        int index    = inst_addr          // hash instruction address to
                     % SD_SIZE;           // get location in direct mapped sd
                                          // table
        if (sd[index].inst_addr == inst_addr) {
               return sd[index].stride_det_r;
        } else {
               return FALSE;
        }
}
// Function to return stride detected status (for write) based on instruction
address
bool get_stride_det_w (int inst_addr) {
        int index    = inst_addr          // hash instruction address to
                     % SD_SIZE;           // get location in direct mapped sd
                                          // table
        if (sd[index].inst_addr == inst_addr) {
               return sd[index].stride_det_w;
        } else {
               return FALSE;
        }
}
```

In one example embodiment, the general stride detected status may be read at step 375 of FIG. 6, and in the event of a stride being detected, the victim selection step 385 may differ depending on whether there was a read stride detection or a write stride detection.

Figure 11:
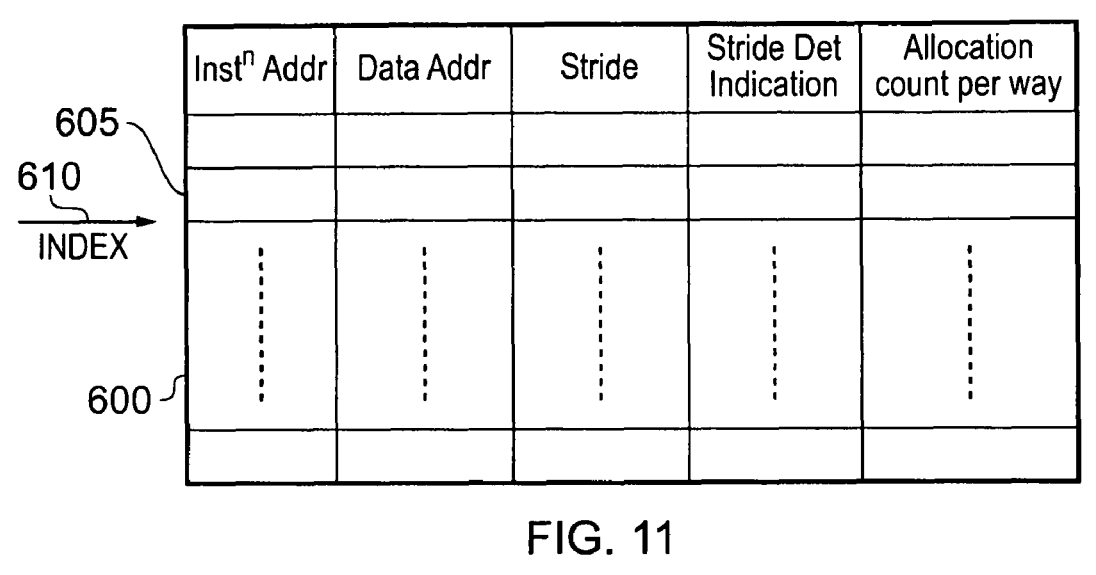

FIG. 11 illustrates an alternative form of stride detection table to that shown in FIG. 5 or 9 where, in addition to a stride detection indication, an allocation count per way is kept for each entry. Hence, as shown, the stride detection table 600 has a plurality of entries 605, with an index 610 being generated based on a current instruction address in order to identify one of the entries in the table. The instruction address, data address, stride value and stride detection indication fields are used in the same manner as discussed earlier with reference to FIG. 5. The manner in which the allocation count per way field is used will now be described in more detail with reference to FIGS. 12 and 13.

Figure 12:
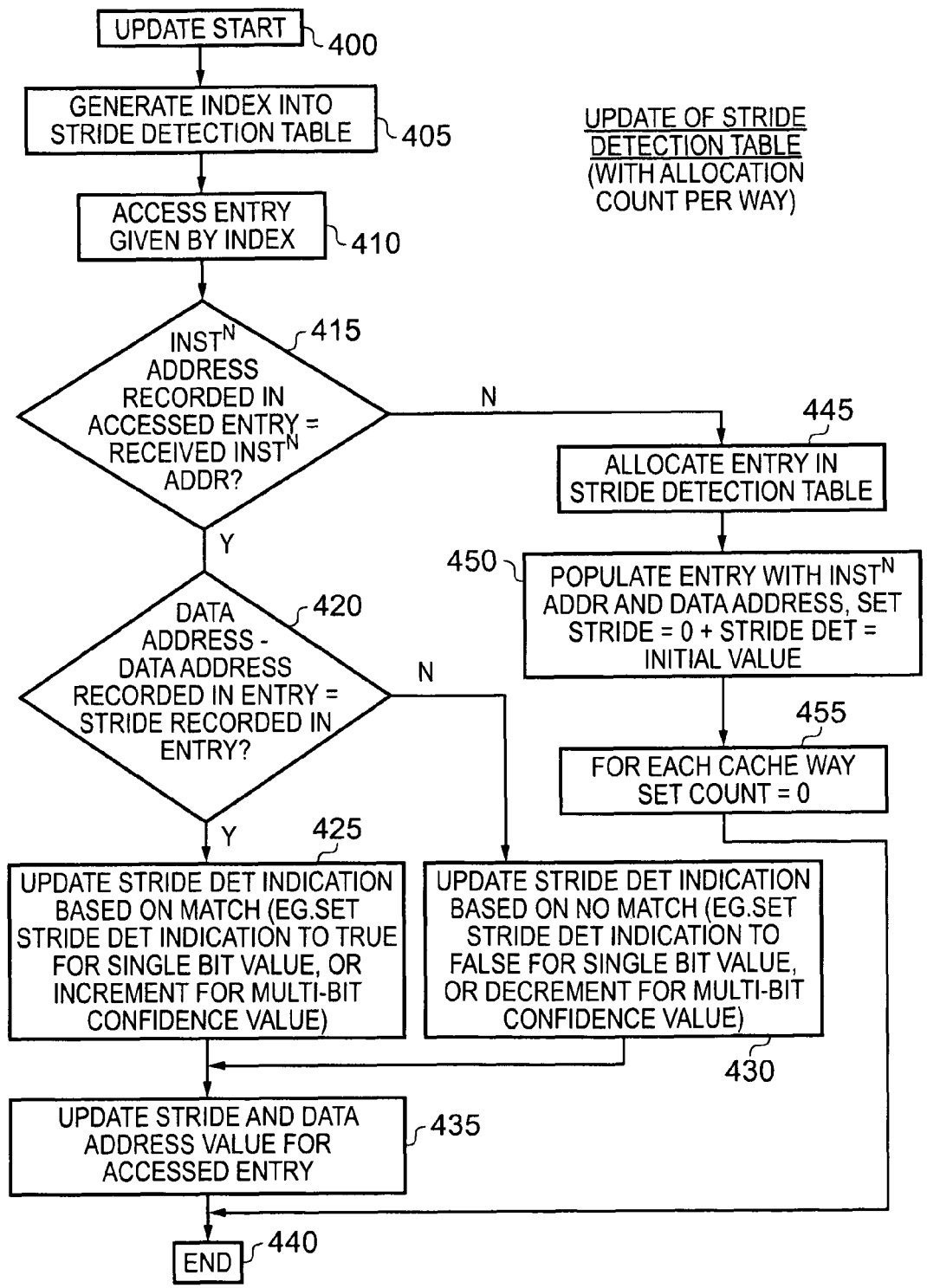
FIG. 12 is a flow diagram illustrating how the stride detection table of FIG. 11 is updated in accordance with one embodiment.

As will be seen from a comparison of FIG. 12 with FIG. 7, the flow diagram of FIG. 12 is identical to FIG. 7, with the exception that an additional step 455 is performed in addition to step 450 when populating an entry of the table following a determination that the current instruction address does not match the instruction address in the accessed entry. In particular, at step 455, the count value for each cache way is set equal to zero. Hence, by way of example, considering a four way set associative cache, the allocation count per way field will maintain four counters, one for each way, and at step 455 each of these counters will be initialized to zero.

The following pseudo-code illustrates how the stride detection table of FIG. 11 can be constructed in accordance with one embodiment:

```
// State
// -----
// Stride Detector Entry
typedef struct sd_e {
        int     inst_addr;                   // Address of instruction being tracked
        int     data_addr;                   // Last address accessed by instruction
        int     stride;                      // Stride from Last - 1 access
        bool    stride_det;                  // Striding access detected
        int     alloc_count[N_CACHE_WAYS];   // count of allocations to each way
} sd_e;
// Persistent storage, table of SD_SIZE sd_e entries
sd_e sd[SD_SIZE];
```

Further, the following pseudo-code illustrates how the process of FIG. 12 can be implemented in one embodiment:

```
// Function to update SD table
void update_stride_det_table (int inst_addr, int data_addr) {
        int index    = inst_addr          // hash instruction address to
                     % SD_SIZE;           // get location in direct mapped sd
                                          // table
        // inst_addr previously encountered?
        if (sd[index].inst_addr == inst_addr) {
               if ((data_addr - sd[index].data_addr) == sd[index].stride) {
                      sd[index].stride_det = TRUE;
               } else {
                      sd[index].stride_det = FALSE;
               }
               // Record stride and data address for next time
               sd[index].stride       = data_addr - sd[index].data_addr;
               sd[index].data_addr    = data_addr;
        } else {
               // allocate entry for non-resident inst_addr
               sd[index].inst_addr    = inst_addr;
               sd[index].data_addr    = data_addr;
               sd[index].stride       = 0;
               sd[index].stride_det   = FALSE;
               for (int i=0;i<N_CACHE_WAYS;i++) {
                      sd[index].alloc_count[i] = 0;
               }
        }
}
```

As with the earlier discussed example of stride detection table in FIG. 5, the stride detection indication can be obtained using the process described in FIG. 8, as for example will be required when performing step 375 of FIG. 6.

Figure 13:
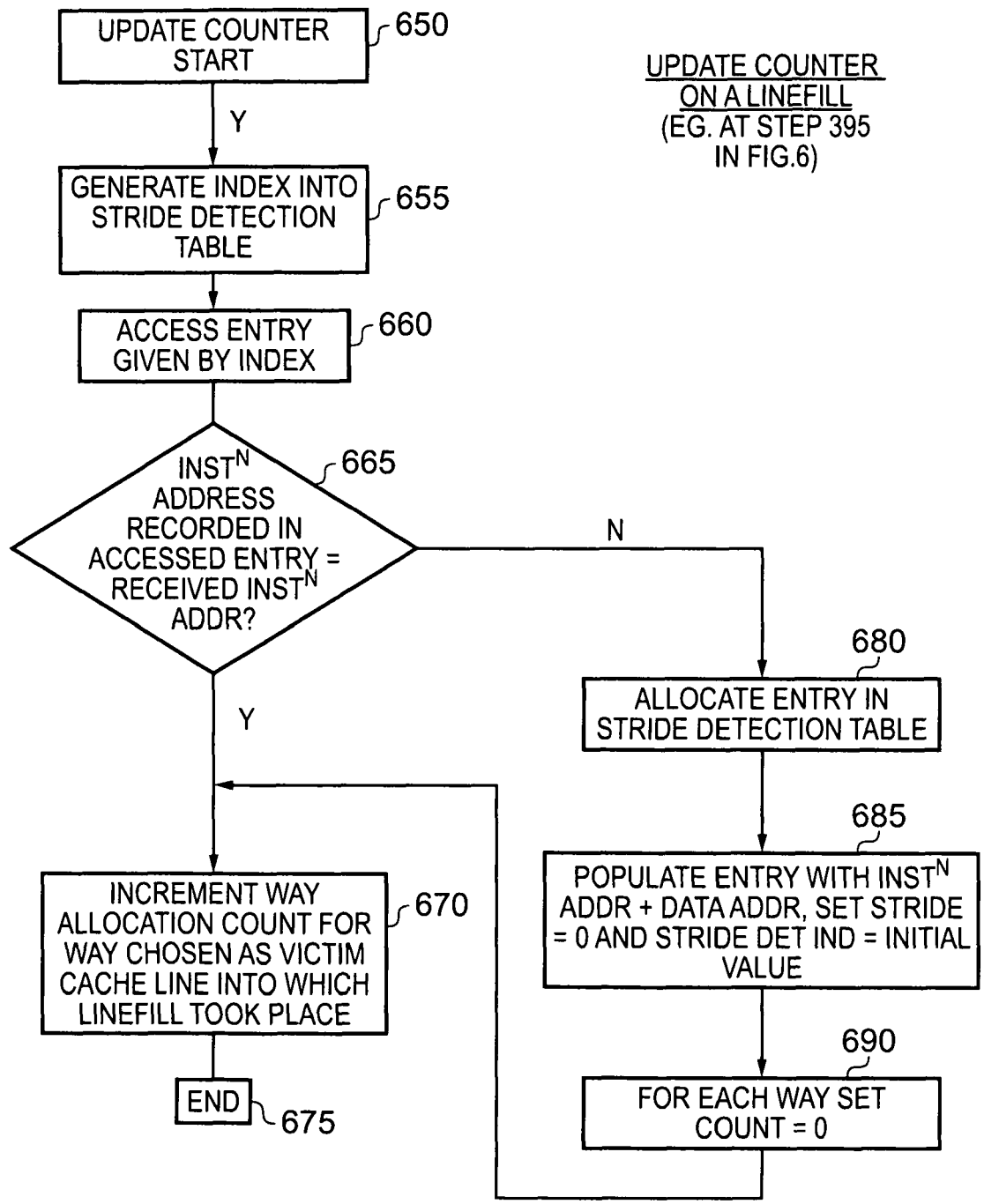
FIG. 13 is a flow diagram illustrating how the counter value retained within an entry of the stride detection table of FIG. 11 is updated in accordance with one embodiment.

FIG. 13 is a flow diagram illustrating how the counter values may be updated during a linefill operation, such as for example will be performed when executing step 395 of FIG. 6. At step 650, the update of the counter process begins, whereafter at step 655 an index into the stride detection table is generated using the current instruction address (i.e. the address of the instruction which caused the data access request to be issued, resulting in the cache miss and the subsequent linefill operation). Thereafter, at step 660, the entry given by that index is accessed. At step 665, it is determined whether the instruction address recorded in the instruction address field of the entry is the same as the instruction address from which the index was generated at step 655. If it is, then this indicates that the entry is associated with the instruction, and the process proceeds to step 670, where the way allocation count for the particular way containing the victim cache line selected during either step 385 or 390 is incremented. Thereafter the process ends at step 675.

If however a match is not detected at step 665, then the process proceeds to step 680, where an entry is allocated in the stride detection table for the current instruction address, typically by overwriting the current contents of the indexed entry. The entry is then populated with the current instruction address, the current data address, the stride value is initialized to zero, and the stride detection indication is set to an initial value, such as a logic zero value (step 685). In addition, at step 690, the count value for each way is set equal to zero. Thereafter, the process returns to step 670 where the count value for the way containing the victim cache line is incremented, after which the process ends at step 675.

The following pseudo-code illustrates one way in which the process of FIG. 13 can be implemented.

```
// Function called to update counter on a linefill
void alloc_count_update (int inst_addr, int
data_addr, int victim_way) {
    int index   = inst_addr % SD_SIZE; // hash instruction address
                                       to
                                       // get location in direct mapped
                                       sd table
    if (sd[index].inst_addr == inst_addr) {
        sd[index].alloc_count[victim_way]++;
    } else {
        // allocate entry for non-resident inst_addr
        sd[index].inst_addr     = inst_addr;
        sd[index].data_addr     = data_addr;
        sd[index].stride        = 0;
        sd[index].stride_det    = FALSE;
        for (int i=0;i<N_CACHE_WAYS;i++) {
            sd[index].alloc_count[i] = 0;
        }
    }
}
```

With counters maintained in the above manner, these counters can be referenced when seeking to apply the alternative allocation policy, such as when selecting a victim cache line at step 385 of FIG. 6. The process used in one embodiment to identify the way with the highest count value is illustrated with reference to FIG. 14. The process starts at step 700, and then an index is generated into the stride detection table using the current instruction address at step 705. Thereafter, two variables are set equal to zero at step 710, these variables being referred to as "high_way" and "high_count". At step 715, a variable "i" is also set equal to zero.

Thereafter, at step 720, having regard to the entry of the stride detection table accessed using the index generated at step 705, it is determined whether the count value for way i is greater than the high_count value. If it is, then the process proceeds to step 725, where the variable high_way is set equal to i. Then, at step 730, the variable high_count is set equal to the count for way i.

It is then determined at step 735 whether the variable i is less than the total number of ways, and if it is the variable i is incremented at step 740, with the process returning to step 720.

If at step 720 it is determined that the count for way i is not greater than the high_count value, then the process merely bypasses steps 725 and 730 and proceeds directly to step 735.

It will be appreciated that as a result of this process, the count values for each of the ways are considered, and by the time all of the ways have been considered, the variable high_way will identify the way whose count value is the largest. Accordingly, at step 745, the high_way value is output.

Figure 14:
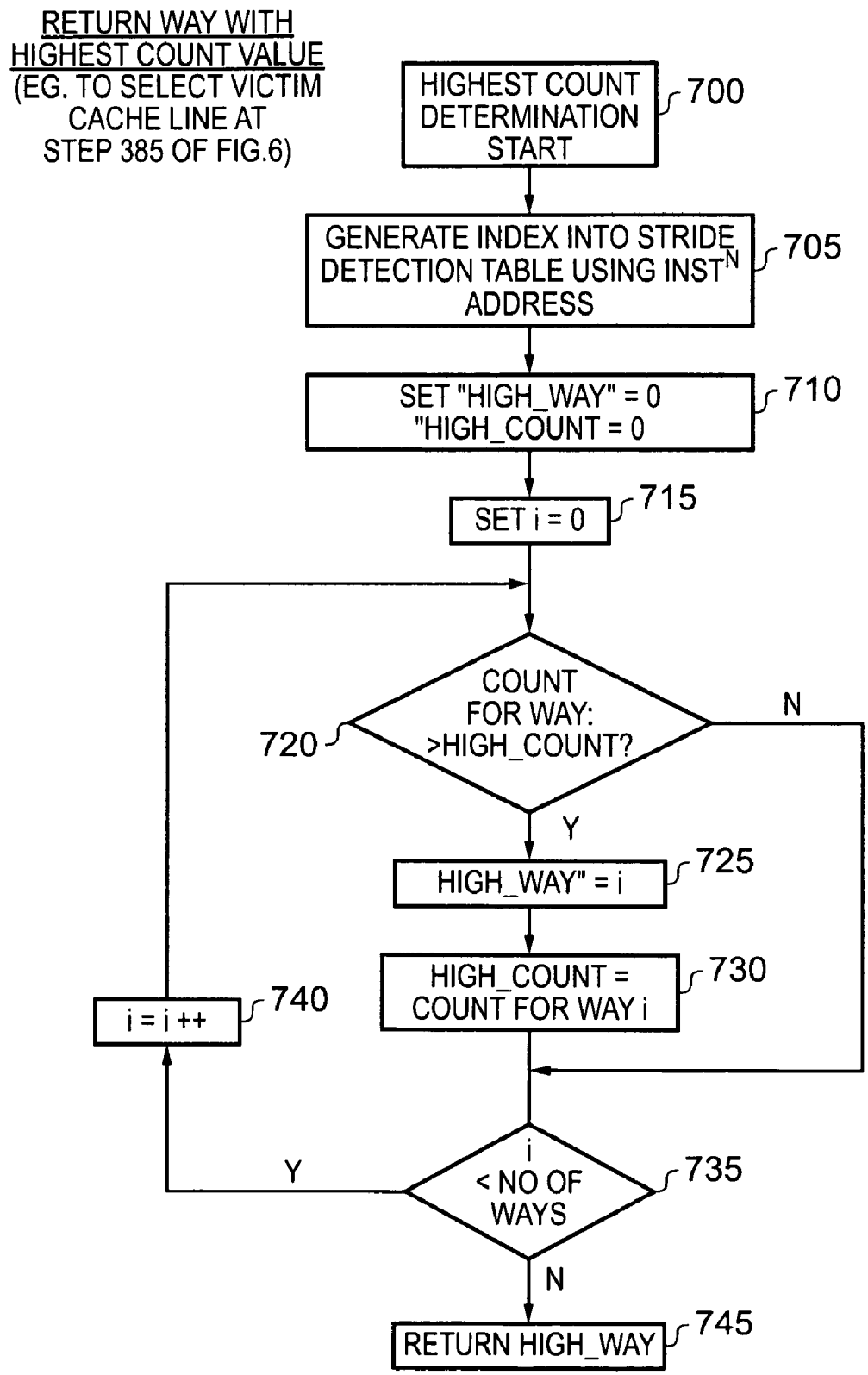
FIG. 14 is a flow diagram illustrating how the way with the highest count value can be identified in accordance with one embodiment.

The following pseudo-code illustrates how the highest count determination process of FIG. 14 may be implemented in one embodiment:

```
// Function to return way with highest alloc count
int get_highest_alloc_count (int inst_addr) {
    int index    = inst_addr % SD_SIZE; // hash instruction
                                        address to
                                        // get location in direct mapped sd
    int high_way = 0;                   // table
    int high_count = 0;
    for (int i=0;i<N_CACHE_WAYS;i++) {
        if (sd[index].alloc_count[i] > high_count) {
            high_way = i;
            high_count = sd[index].alloc_count[i];
        }
    }
    return high_way;
}
```

The alternative allocation scheme can then choose the victim way in dependence on the output of the highest allocation count process of FIG. 14. The following pseudo-code illustrates a first technique for selecting a victim cache line using the highest count value:

```
//
// Example Alternate Victim Way Selection
// =====================================
// This example selects the way with most allocations for the instruction
// instance.
//
int SelectVictimAlternate (int inst_addr, int data_addr, bool readnwrite) {
    return get_highest_alloc_count(inst_addr);
}
```

As will be appreciated from the above pseudo-code, in accordance with this example approach, the method of claim 14 is performed, with the victim cache line being chosen from the way identified at step 745.

The following pseudo-code illustrates a slightly modified example where the same approach is taken for an initial period of time, and thereafter the way with the next highest allocation count is picked:

```
//
// Example Alternate Victim Way Selection
// =====================================
// This example selects the way with most allocations for the
// instruction instance. After a period, the way with the next highest
// allocations is picked, and so on.
//
int allocation_count;
int SelectVictimAlternate (int inst_addr, int data_ddr, bool readnwrite) {
    int victim = get_highest_alloc_count (inst_addr);
    allocation_count++;
    if (allocation_count > ALLOC_MAX) {
        reset_alloc_count (inst_addr, victim); // reset count
            to zero, next
```

```
            // highest count will be
            // picked next time
        allocation_count = 0;
        }
    return victim;
}
```

In accordance with this technique, an allocation count value is maintained and each time the highest allocation count process of FIG. 14 is performed, that allocation count value is increased. When that allocation count value exceeds a predetermined value ALLOC_MAX, then the entry identified by the instruction address is accessed, and the count value associated with the way from which the victim cache line has been chosen is reset to zero, whereafter the allocation_count value is reset to zero.

This means that the next time the SelectVictimAlternate process takes place, the way with the next highest allocation count will be chosen. By such an approach, it is possible to mitigate against effectively limiting the cache size by limiting all of the allocations to a particular way.

In one embodiment, the counters maintained in the entries of the stride detection table will be saturating counters. In one embodiment, the following pseudo-code may be used to implement a function which is called periodically to reset all counters, for example on expiry of a global counter value:

```
// Function called periodically to reset all counters
void alloc_count_global_reset ( ) {
    for (int i=0;i<SD_SIZE;i++) {
        for (int j=0;j<N_CACHE_WAYS;j++) {
            sd[i].alloc_count[j] = 0;
        }
    }
}
```

It will be appreciated that in accordance with the above pseudo-code, the process steps through each entry in the table and within each entry sets each of the alloc_count values for each of the ways to zero.

Such an approach can be used to avoid saturation.

The following pseudo-code illustrates a general function that can be called to reset a counter value for a particular instruction and way within the stride detection table:

```
// Function to reset an alloc_count for a particular instruction/way
void reset_alloc_count(inst inst_addr, int i) {
    int index  = inst_addr        // hash instruction address to
                 % SD_SIZE;       // get location in direct mapped sd
                                  // table
    sd[index].alloc_count[i] = 0;
}
```

In accordance with this technique, the entry associated with a particular instruction address is accessed, and the count value for a particular identified way is then set equal to zero. This hence provides a technique for deselecting a particular way after a period of time, so that future allocations in accordance with the alternative allocation policy will not allocate into that way, at least not until the count value has increased to become the maximum value (for example due to allocations taking place in accordance with the standard allocation policy).

Figure 15:
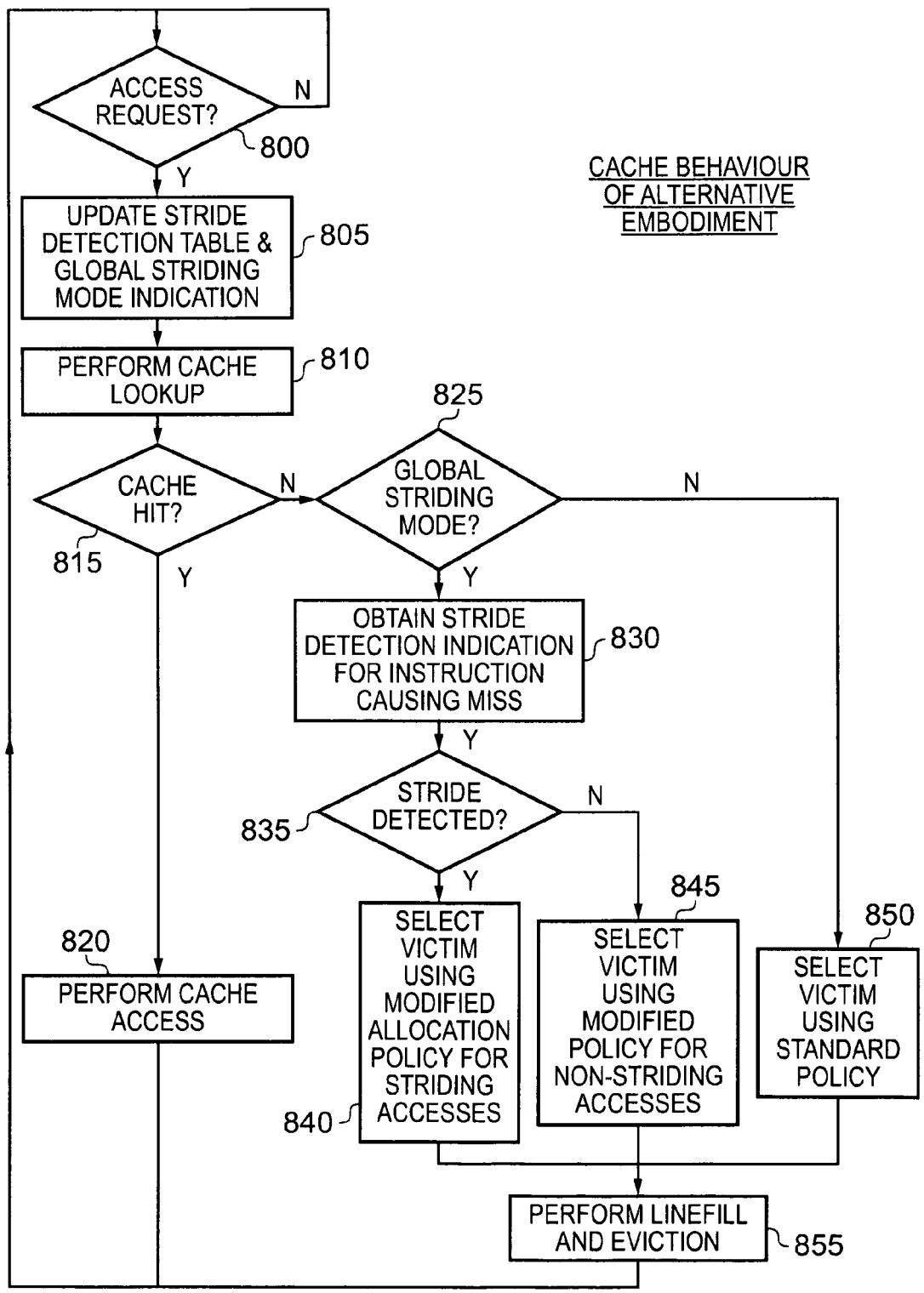
FIG. 15 is a flow diagram illustrating the behaviour of the cache in accordance with an alternative embodiment.

FIG. 15 illustrates an alternative embodiment for the general cache behaviour. When compared with the earlier described FIG. 6, it can be seen that there are a number of similarities, but in the embodiment of FIG. 15 a global striding mode indication is also maintained. When the global striding mode indication is set, this indicates that the standard allocation policy is not to be used for any subsequent allocations whilst that global stride mode remains set, irrespective of whether the accesses requiring allocation are associated with a detected regular stride or not.

Accordingly, following receipt of an access request, the stride detection table is updated at step 805 in the same way as discussed earlier with reference to step 355 of FIG. 6. In addition, the global striding mode indication is updated. In one embodiment, this global striding mode indication can be a single bit value, which may be updated by the stride detection circuitry upon occurrence of a predetermined event. This event may for example be a particular indication provided by the processor causing the global striding mode value to be set, or as another example may occur once the stride detection circuitry has detected a sequence of accesses separated by a regular stride.

It will be appreciated that in accordance with the technique of FIG. 6, an alternative allocation policy was only used for those accesses associated with a regular stride. Any other accesses were allocated into the cache using a standard allocation policy, and depending on the standard allocation policy this may in fact cause some non-sequential access information to be allocated into a way that is being used to store the accesses of a sequential stream, thereby slightly degrading the benefits that arise from placing all of those accesses separated by a regular stride within a single way. However, once the global striding mode indication is set, this can be avoided by also using a modified policy for the non-striding accesses, as will be discussed in more detail with reference to the remainder of FIG. 15.

In particular, following step 805, a cache lookup is performed at step 810, whereafter it is determined whether there has been a cache hit at step 815. If so, the access is performed at step 820, steps 810, 815 and 820 corresponding with steps 360, 365 and 370 of FIG. 6.

In the event of a cache miss at step 815, the process proceeds to step 825, where it is determined whether the global striding mode is set. If not, the process proceeds to step 850, where the victim is selected using a standard allocation policy.

However, if the global striding mode indication is set, then the stride detection indication is obtained at step 830 for the instruction causing a miss, using the approach described earlier with reference to step 375 of FIG. 6. Thereafter, it is determined whether a stride has been detected at step 835 (step 835 corresponding to step 380 of FIG. 6), and if it is the victim cache line is selected using the modified allocation policy for striding accesses at step 840. Step 840 corresponds with step 385 of FIG. 6.

However, if a stride is not detected at step 835, then the process proceeds to step 845, where the victim cache line is selected using another modified policy, this time a modified policy for non-striding accesses.

Accordingly, if we consider a simple form of alternative allocation policy for striding accesses as discussed earlier, where read accesses are allocated to way zero and write accesses are allocated to way one, then the other modified policy for non-striding accesses that could be performed at step 845 may choose to allocate all other accesses into ways two or three.

Following step 840, step 845 or step 850, the process proceeds to step 855 where a linefill and eviction operation is performed, step 855 corresponding to step 395 of FIG. 6.

Figure 16A:
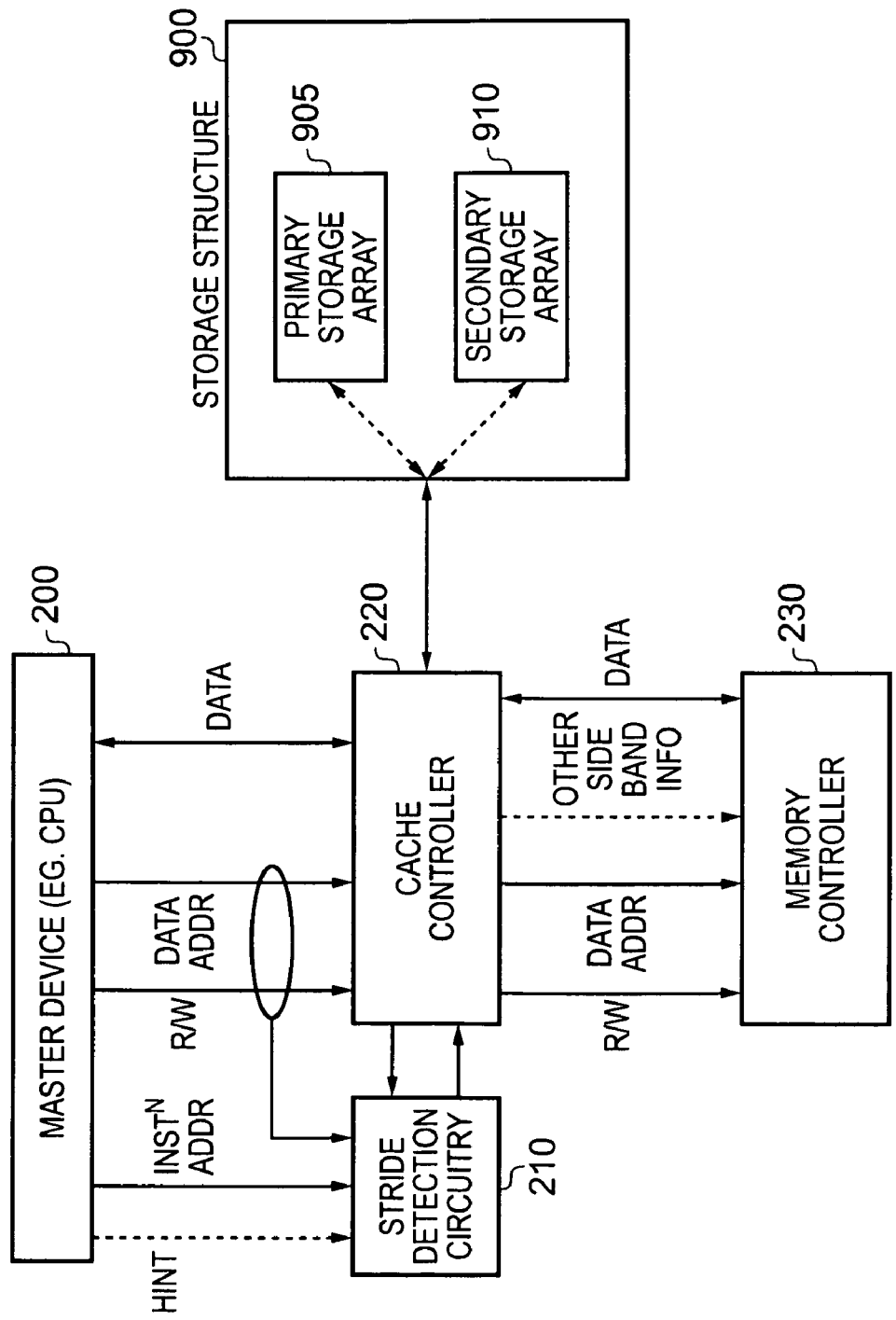
FIGS. 16A and 16B illustrate a data processing apparatus in accordance with an alternative embodiment where the storage structure of the cache comprises a primary storage array and a secondary storage array.
Figure 16B:
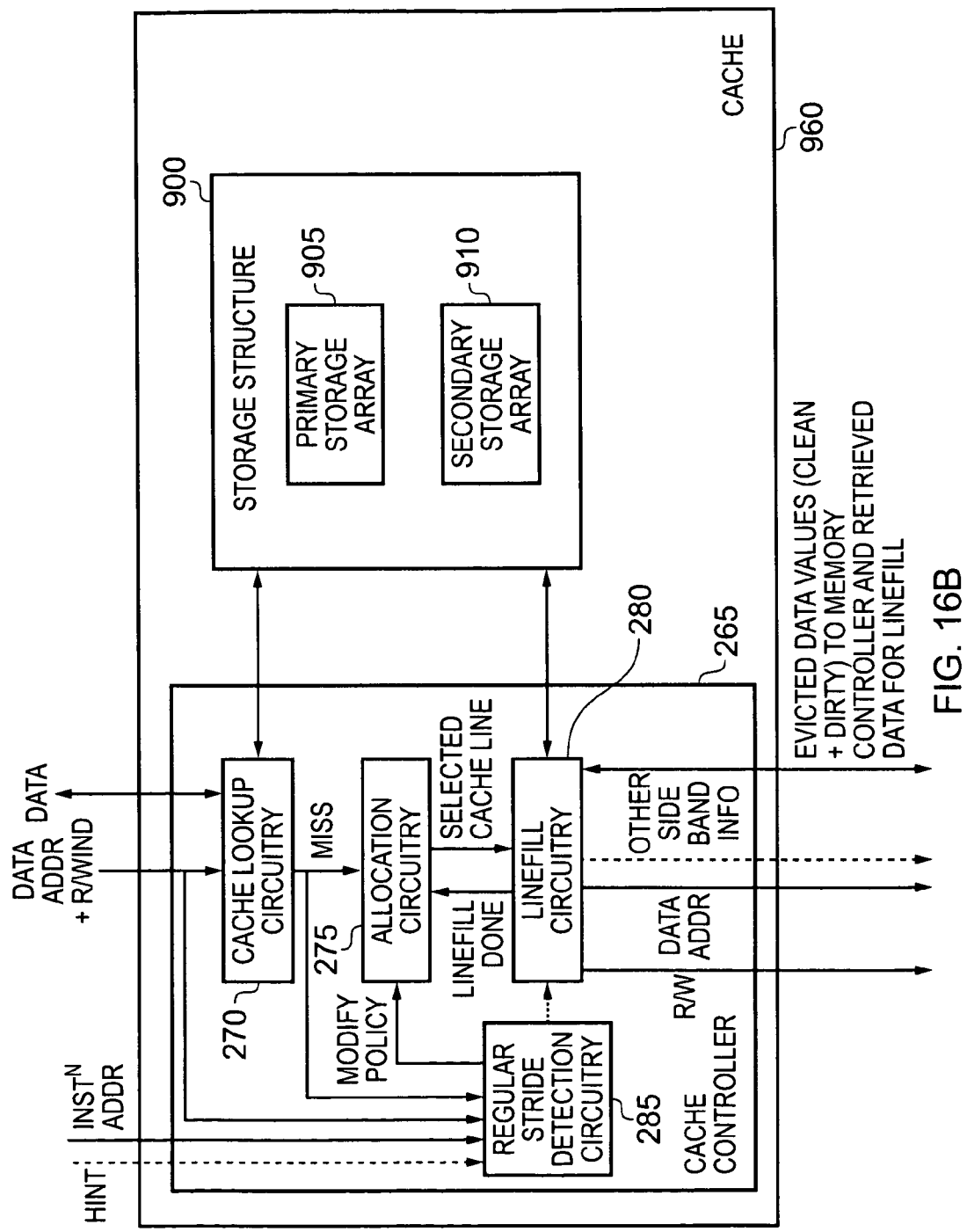

FIGS. 16A and 16B correspond generally with the earlier described FIGS. 4A and 4B, but instead of the cache having a set associative storage structure, in this example the cache has a storage structure 900 comprising a primary storage array 905 and a secondary storage array 910. When considering the general cache behaviour described earlier with reference to FIG. 6, then in one embodiment when employing the standard allocation policy at step 390, the allocation circuitry will select the victim cache line from the primary storage array 905, whilst when employing the alternative allocation policy at step 385, the allocation policy will determine the victim cache line from the secondary storage array 910. As a further option, the alternative allocation policy may identify a first portion of the secondary storage array 910 from which the victim cache line is determined for read accesses, and may identify a second portion of the secondary storage array 910 from which the victim cache line is determined for write accesses.

From the above described embodiments, it will be appreciated that such embodiments enable the detection of when a sequential copy or set activity is underway, with the cache allocation policy then being changed to allocate the read and write streams in a manner that will improve the performance and power consumption when that data is subsequently evicted to the memory. In one example, the read stream is allocated to a particular way, and the write stream is allocated to a further particular way. The mechanisms of the described embodiments ensure that when a particular way is chosen for sequential data, an indication of that way is retained so that in future if any further sequential copies are issued, they can also be targeted at ways in the cache that already contain sequential data. The reason for doing this is that, if the memcpy read and write streams are sent to ways in the cache that previously have been targeted for sequential data, then the write eviction streams that subsequently take place are more likely to contain sequential data too. This in turn significantly reduces the number of precharge and activate operations in the DRAM, improving overall DRAM utilisation rates, thereby improving performance and reducing power consumption.

As described in the above embodiments, a number of mechanisms can be used by the stride detection circuitry to detect when a regular stream of accesses is underway, but generally the mechanisms described involve either detecting regular patterns of accesses (in some embodiments this may be done by re-using some existing hardware present for prefetching), or by reacting to explicit hints provided from the master device indicating that a block copy or set operation is starting, for example an instruction set architecture (ISA) hint.

As will be apparent from the above description of embodiments the alternative allocation policy used once a sequence of striding accesses has been detected can take a variety of forms. The allocation policy may be predetermined, such that such accesses are always allocated to particular ways. Alternatively, as described, count values can be kept with the aim of allocating a striding access to a way with the highest probability of already containing striding data. It may then be decided to simply allocate to the same way as the last striding data was allocated to, or alternatively after a particular time, a switch could be made to the way having the next highest probability of containing striding data, for example to mitigate limiting the cache size by limiting to a particular way.

As discussed with reference to FIGS. 4A and 4B, when the alternative allocation policy allocates striding read data to one way, striding write data to another way, and any non-striding accesses are allocated using the standard allocation policy, then it is also possible to output as sideband information to the memory controller an indication of the type of eviction taking place. In particular, the memory controller could then be advised that there are three different types of eviction streams occurring, namely evictions to make space for read data, evictions to make space for write data, and general evictions not associated with striding accesses. Using such information, the memory controller could then endeavour to keep a memory page open for the read evictions, a different memory page open for the write evictions, and a third page open for random evictions during the start up phase.

In summary, the techniques of the above described embodiments ensure that by managing where sequential block memory activities are located in a cache, then when that data is subsequently evicted, this can lead to much better DRAM memory utilisation by significantly reducing the number of precharge and activate operations within the DRAM, such precharge and activate operations being relatively expensive and dramatically reducing DRAM utilisation.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A cache device for use in a data processing apparatus to store data values for access by an associated master device, each data value having an associated memory location in a memory device, the memory device being arranged as a plurality of blocks of memory locations, each block having to be activated before any data value stored in that block can be accessed, the cache device comprising:
   a cache storage having a plurality of cache lines for storing said data values;
   allocation circuitry, responsive to a data value to be allocated into the cache storage, to determine which cache line of said plurality of cache lines to store said data value into, the cache storage providing more than one cache line in which the data value can be stored, and the allocation circuitry employing an allocation policy to determine one of said more than one cache line as a selected cache line for storing of said data value;
   eviction circuitry, responsive to an indication of said selected cache line, to evict any data value currently stored in said selected cache line, whereby the evicted data value is written into the memory device at the associated memory location if that evicted data value is more up to date than the data value already stored in the memory device at the associated memory location; and
   regular access detection circuitry for detecting occurrence of a sequence of accesses to data values whose associated memory locations follow a regular pattern;
   upon detection of the occurrence of said sequence of accesses by the regular access detection circuitry, said allocation policy employed by the allocation circuitry being altered to increase a likelihood that when an evicted data value output by the eviction circuitry is written to the memory device, the associated memory location resides within an already activated block of memory locations.

2. A cache device as claimed in claim 1, wherein the regular access detection circuitry comprises regular stride detection circuitry for detecting occurrence of a sequence of accesses to data values whose associated memory locations are separated by a regular stride value.

3. A cache device as claimed in claim 1, wherein:
in the absence of detection of the occurrence of said sequence of accesses by the regular access detection circuitry, the allocation circuitry is arranged to employ as said allocation policy a default allocation policy; and
whilst the occurrence of said sequence of accesses is detected by the regular access detection circuitry, the allocation circuitry is arranged to employ an alternative allocation policy;
use of the alternative allocation policy resulting in improved usage of already activated blocks of memory locations when evicted data values are written to the memory device when compared with use of the default allocation policy.

4. A cache device as claimed in claim 3, wherein the alternative allocation policy is predetermined.

5. A cache device as claimed in claim 4, wherein the cache storage is a set associative storage providing a plurality of cache ways, and the alternative allocation policy identifies at least one way for allocation of data values pertaining to read accesses whilst the occurrence of said sequence of accesses is detected by the regular access detection circuitry, and at least one other way for allocation of data values pertaining to write accesses whilst the occurrence of said sequence of accesses is detected by the regular access detection circuitry.

6. A cache device as claimed in claim 4, wherein:
the cache storage comprises a primary storage array and a secondary storage array;
when employing the default allocation policy, the allocation circuitry determining said selected cache line from the primary storage array; and
when employing the alternative allocation policy, the allocation circuitry determining said selected cache line from the secondary storage array.

7. A cache device as claimed in claim 6, wherein the alternative allocation policy identifies a first portion of the secondary storage array from which the selected cache line is determined for read accesses, and identifies a second portion of the secondary storage array from which the selected cache line is determined for write accesses.

8. A cache device as claimed in claim 3, wherein the alternative allocation policy is determined having regard to at least one item of historical allocation data.

9. A cache device as claimed in claim 8, wherein said at least one item of historical allocation data is maintained by the regular access detection circuitry and is output to the allocation circuitry upon detection of the occurrence of said sequence of accesses by the regular access detection circuitry, the allocation circuitry being responsive to said at least one item of historical allocation data to determine the alternative allocation policy.

10. A cache device as claimed in claim 8, wherein said at least one item of historical allocation data is maintained by the regular access detection circuitry and upon detection of the occurrence of said sequence of accesses by the regular access detection circuitry, the regular access detection circuitry utilises said at least one item of historical allocation data to determine the alternative allocation policy.

11. A cache device as claimed in claim 8, wherein:
the cache storage is a set associative storage providing a plurality of cache ways;
the at least one item of historical allocation data identifies at least one cache way of said plurality of cache ways; and
the alternative allocation policy causes data values to be allocated into said at least one cache way for at least a first period whilst the occurrence of said sequence of accesses is detected by the regular access detection circuitry.

12. A cache device as claimed in claim 11, further comprising:
counter circuitry for maintaining, for each way, at least one count value indicative of a number of data values allocated to that way; and
the at least one item of historical allocation data comprises an indication as to at least the cache way with the largest count value.

13. A cache device as claimed in claim 12, further comprising:
a regular access detection table incorporating the counter circuitry and maintained by the regular access detection circuitry, the regular access detection table having a plurality of entries, and each entry including a separate count value for each way;
execution by said associated master device of an instruction having an instruction address causing the data value to be allocated in the cache storage by the allocation circuitry; and
the regular access detection circuitry being responsive to the instruction address to identify one of said entries of the regular access detection table, and to produce as said at least one item of historical allocation data an indication as to the cache way identified in that entry as having the largest count value.

14. A cache device as claimed in claim 11, wherein:
the at least one item of historical allocation data comprises an indication as to a cache way of said plurality of cache ways into which was allocated the data value of the access performed immediately prior to detection of the occurrence of said sequence of accesses by the regular access detection circuitry.

15. A cache device as claimed in claim 11, wherein:
execution by said associated master device of an instruction having an instruction address causing the data value to be allocated in the cache storage by the allocation circuitry; and
the at least one item of historical allocation data comprises an indication as to a cache way of said plurality of cache ways into which was allocated the data value of the last access performed by the same instruction prior to detection of the occurrence of said sequence of accesses by the regular access detection circuitry.

16. A cache device as claimed in claim 11, wherein:
the at least one item of historical allocation data comprises an indication as to at least one cache way of said plurality of cache ways into which data values were allocated during a previous detection of the occurrence of said sequence of accesses by the regular access detection circuitry.

17. A cache device as claimed in claim 2, wherein:
the regular stride detection circuitry compares the associated memory location of each data value allocated into the cache storage with the associated memory location of a preceding data value allocated into the cache storage in order to detect the occurrence of a sequence of accesses to data values whose associated memory locations are separated by the regular stride value.

18. A cache device as claimed in claim 17, further comprising:
- a stride detection table maintained by the regular stride detection circuitry, the stride detection table having a plurality of entries, and each entry including an indication of the associated memory location of a preceding data value allocated into the cache and a stride value determined at the time that preceding data value was allocated into the cache;
- for each data value to be allocated into the cache storage, the regular stride detection circuitry is arranged:
- (i) to reference a selected one of said entries;
- (ii) to determine whether the associated memory location of that data value is separated from the associated memory location of the preceding data value identified in the selected entry by said stride value identified in the selected entry; and
- (iii) to detect the occurrence of a sequence of accesses to data values whose associated memory locations are separated by the regular stride value in dependence on said determination.

19. A cache device as claimed in claim 18, wherein:
- execution by said associated master device of an instruction having an instruction address causes the data value to be allocated in the cache storage by the allocation circuitry;
- the regular stride detection circuitry is responsive to the instruction address to determine the selected entry to be referenced;
- each entry stores the instruction address of the instruction causing that entry to be populated; and
- for each data value to be allocated into the cache, the regular stride detection circuitry is arranged to only perform said determination step (ii) if the instruction address stored in said selected entry matches the instruction address of the instruction causing said data value to be allocated in the cache storage.

20. A cache device as claimed in claim 18, wherein:
- each entry of the stride detection table maintains stride detection indication data; and
- when the selected entry is referenced by the regular stride detection circuitry, the regular stride detection circuitry is arranged to update the stride detection indication data dependent on whether the associated memory location of the data value being allocated in the cache storage is separated from the associated memory location of the preceding data value identified in the selected entry by said stride value identified in the selected entry or not.

21. A cache device as claimed in claim 20, wherein:
- the stride detection indication data is a single bit value which is set to a first value on determination that the associated memory location of the data value being allocated in the cache storage is separated from the associated memory location of the preceding data value identified in the selected entry by said stride value identified in the selected entry, and is set to a second value on determination that the associated memory location of the data value being allocated in the cache storage is not separated from the associated memory location of the preceding data value identified in the selected entry by said stride value identified in the selected entry;
- said first value indicating detection of said occurrence of a sequence of accesses to data values whose associated memory locations are separated by the regular stride value, and said second value indicating that said sequence of accesses to data values whose associated memory locations are separated by the regular stride value has not been detected.

22. A cache device as claimed in claim 20, wherein:
- the stride detection indication data is a multi bit value which is modified in dependence on a determination as to whether the associated memory location of the data value being allocated in the cache storage is separated from the associated memory location of the preceding data value identified in the selected entry by said stride value identified in the selected entry, or is not so separated.

23. A cache device as claimed in claim 22, wherein when the stride detection indication data reaches a predetermined threshold value, the regular stride detection circuitry determines that occurrence of a sequence of accesses to data values whose associated memory locations are separated by said regular stride value has been detected.

24. A cache device as claimed in claim 20, wherein separate stride detection indication data is maintained for read accesses and for write accesses.

25. A cache device as claimed in claim 1, wherein the regular access detection circuitry is responsive to a hint signal issued by the associated master device to determine the occurrence of a sequence of accesses to data values whose associated memory locations follow a regular pattern.

26. A cache device as claimed in claim 25, wherein the hint signal is issued by the associated master device on execution of a predetermined instruction.

27. A cache device as claimed in claim 25, wherein the hint signal is issued by the associated master device on updating of an item of device state.

28. A cache device as claimed in claim 1, further comprising a storage for storing a global striding mode value which is set upon occurrence of a predetermined event, and whilst the global striding mode value is set, the allocation policy employed by the allocation circuitry is altered from a default allocation policy for all data value to be allocated into the cache.

29. A cache device as claimed in claim 28, wherein whilst the global striding mode value is set, a first alternative allocation policy is employed whilst said sequence of accesses is detected by the regular access detection circuitry, and a second alternative allocation policy is employed whilst said sequence of accesses is not detected by the regular access detection circuitry.

30. A cache device as claimed in claim 1, wherein the cache storage is a set associative storage, the set associative storage providing more than one cache line in which the data value can be stored having regard to its associated memory location.

31. A cache device as claimed in claim 30, wherein:
- the set associative storage is an n-way set associative storage, providing a choice of n cache lines in which the data value can be stored having regard to its associated memory location.

32. A cache device as claimed in claim 3, wherein the eviction circuitry issues sideband information providing additional information about the data being evicted, the additional data being dependent on the allocation policy employed when that data now being evicted was originally allocated in the cache storage.

33. A cache device as claimed in claim 32, wherein:
- the cache storage is a set associative storage providing a plurality of cache ways;
- the alternative allocation policy identifies at least one way for allocation of data values pertaining to read accesses whilst the occurrence of said sequence of accesses is detected by the regular access detection circuitry, and at least one other way for allocation of data values pertaining to write accesses whilst the occurrence of said sequence of accesses is detected by the regular access detection circuitry; and the sideband information identifies whether the eviction data is read eviction data, write eviction data or other eviction data dependent on which way the data is being evicted from.

34. A cache device as claimed in claim 1, wherein the eviction circuitry issues sideband information providing additional information about the data being evicted, with the additional data being dependent on historical access behaviour to that data now being evicted.

35. A cache device for use in a data processing apparatus to store data values for access by an associated master device, each data value having an associated memory location in a memory device, the memory device being arranged as a plurality of blocks of memory locations, each block having to be activated before any data value stored in that block can be accessed, the cache device comprising:

cache storage means for providing a plurality of cache lines for storing said data values;

allocation means, responsive to a data value to be allocated into the cache storage means, for determining which cache line of said plurality of cache lines to store said data value into, the cache storage means for providing more than one cache line in which the data value can be stored, and the allocation means for employing an allocation policy to determine one of said more than one cache line as a selected cache line for storing of said data value;

eviction means, responsive to an indication of said selected cache line, for evicting any data value currently stored in said selected cache line, whereby the evicted data value is written into the memory device at the associated memory location if that evicted data value is more up to date than the data value already stored in the memory device at the associated memory location; and regular access detection means for detecting occurrence of a sequence of accesses to data values whose associated memory locations follow a regular pattern;

upon detection of the occurrence of said sequence of accesses by the regular access detection means, said allocation policy employed by the allocation means being altered to increase a likelihood that when an evicted data value output by the eviction means is written to the memory device, the associated memory location resides within an already activated block of memory locations.

36. A method of operating a cache device used to store data values for access by an associated master device, each data value having an associated memory location in a memory device, the memory device being arranged as a plurality of blocks of memory locations, each block having to be activated before any data value stored in that block can be accessed, the method comprising:

providing a cache storage having a plurality of cache lines for storing said data values;

responsive to a data value to be allocated into the cache storage, determining which cache line of said plurality of cache lines to store said data value into, the cache storage providing more than one cache line in which the data value can be stored, and said determining step comprising employing an allocation policy to determine one of said more than one cache line as a selected cache line for storing of said data value;

responsive to an indication of said selected cache line, evicting any data value currently stored in said selected cache line, whereby the evicted data value is written into the memory device at the associated memory location if that evicted data value is more up to date than the data value already stored in the memory device at the associated memory location;

detecting occurrence of a sequence of accesses to data values whose associated memory locations follow a regular pattern; and upon detection of the occurrence of said sequence of accesses, said allocation policy employed in said determining step being altered to increase a likelihood that when an evicted data value output during the evicting step is written to the memory device, the associated memory location resides within an already activated block of memory locations.

* * * * *